(12) United States Patent
Allen et al.

(10) Patent No.: US 11,817,667 B1
(45) Date of Patent: Nov. 14, 2023

(54) HIGH VOLTAGE CONNECTOR SERVICE EXTRACTION TOOL

(71) Applicant: Rivian IP Holdings, LLC, Plymouth, MI (US)

(72) Inventors: Bryce Steven Allen, Westminster, CA (US); Jonathan Verghese, Laguna Niguel, CA (US)

(73) Assignee: RIVIAN IP HOLDINGS, LLC, Irvine, CA (US)

( * ) Notice: Subject to any disclaimer, the term of this patent is extended or adjusted under 35 U.S.C. 154(b) by 0 days.

(21) Appl. No.: 18/147,348

(22) Filed: Dec. 28, 2022

(51) Int. Cl.
*H01R 43/20* (2006.01)
*H01R 13/6581* (2011.01)
*H01R 13/516* (2006.01)
*B60R 16/033* (2006.01)

(52) U.S. Cl.
CPC ........... *H01R 43/20* (2013.01); *B60R 16/033* (2013.01); *H01R 13/516* (2013.01); *H01R 13/6581* (2013.01)

(58) Field of Classification Search
CPC .... H01R 4/20; H01R 13/516; H01R 13/6581; B60R 16/033
USPC .................................................... 439/607.01
See application file for complete search history.

(56) References Cited

U.S. PATENT DOCUMENTS

| | | | | |
|---|---|---|---|---|
| 3,951,514 A | * | 4/1976 | Medina, Jr. .......... | G02B 6/3846 385/71 |
| 3,995,363 A | * | 12/1976 | Medina, Jr. .......... | G02B 6/3849 29/280 |
| 4,084,882 A | * | 4/1978 | Hogan ................. | G02B 6/3846 439/903 |
| 6,913,393 B2 | * | 7/2005 | Buck .................... | G02B 6/3849 385/77 |
| 8,112,879 B2 | * | 2/2012 | Morrison ........... | H01R 13/5213 29/764 |
| 8,224,146 B2 | * | 7/2012 | Hackett ................ | G02B 6/3849 385/139 |
| 8,277,128 B2 | * | 10/2012 | Hackett ................ | G02B 6/3898 385/92 |
| 2011/0274401 A1 | * | 11/2011 | Hackett ................ | G02B 6/3898 385/134 |
| 2022/0407248 A1 | * | 12/2022 | Zhuge .................. | H01R 13/516 |

FOREIGN PATENT DOCUMENTS

| ES | 2381995 T3 * | 6/2012 | ........... H01R 13/508 |
|---|---|---|---|
| WO | WO-2011097071 A2 * | 8/2011 | ........... G02B 6/3825 |

\* cited by examiner

*Primary Examiner* — Peter G Leigh
(74) *Attorney, Agent, or Firm* — Foley & Lardner LLP

(57) ABSTRACT

An apparatus can be or include an extraction tool. The extraction tool can include a body. The extraction tool can include a prong including a tip extending from the body, the tip to disengage a retention member to separate the housing from a connector.

19 Claims, 13 Drawing Sheets

HIGH VOLTAGE CONNECTOR SERVICE EXTRACTION TOOL

INTRODUCTION

Vehicles can use electricity to power motors in lieu of gas combustion methods. Electricity can be provided by a battery to operate the vehicle or components thereof to reduce greenhouse gas emissions.

SUMMARY

An apparatus can be an extraction tool. The extraction tool can separate an electrical connector housing from an electrical connector without damaging the connector or the housing. The extraction tool can include a body defining an opening. The extraction tool can include at least one prong extending from the body of the extraction tool (e.g., extending axially from the body). The prong can engage the retention member to cause the retention member to disengage the housing. The housing can be separated from the connector with the prong of the extraction member engaging the retention member. For example, the prong can be provided between the connector and the housing (or between one of the connector or the housing and a shield) to separate the connector from the housing. The prong of the extraction tool contact (e.g., move, force, bend, flex, rotate, push) the retention member to cause the retention member to disengage from a retention groove of the connector or the housing. The housing can be separated from the connector with the retention member disengaged via the prong of the extraction tool.

At least one aspect is directed to an apparatus. The apparatus can be or include an extraction tool. The extraction tool can include a body. The extraction tool can include a prong including a tip extending from the body, the tip to disengage a retention member to separate the housing from a connector.

At least one aspect is directed to a method. The method can include inserting a connector into an opening of an extraction tool. The method can include engaging, by a prong of the extraction tool, a retention member to decouple the connector from a housing. The method can include separating the housing from the connector with the connector in the opening and the prong engaging the retention member.

At least one aspect is directed to a system. The system can be an electrical connector assembly. The electrical connector assembly can include a connector extending into an opening of a housing. The electrical connector assembly can include a retention member to engage a notch of the housing to couple the connector to the housing. The retention member can be engageable by a prong of an extraction tool to separate the housing from the connector. The prong of the extraction tool can include a tip to guide the prong between the connector and the housing without damaging the connector or the housing.

At least one aspect is directed to an electric vehicle. The electric vehicle can include at least one electrical connector assembly. The electrical connector assembly can include a connector extending into an opening of a housing. The electrical connector assembly can include a retention member to engage a notch of the housing to couple the connector to the housing. The retention member can be engageable by a prong of an extraction tool to separate the housing from the connector. The prong of the extraction tool can include a tip to guide the prong between the connector and the housing without damaging the connector or the housing.

At least one aspect is directed to a method. The method can include providing an apparatus. The apparatus can be an extraction tool. The extraction tool can include a prong including a tip extending from the body, the tip to disengage a retention member to separate the housing from a connector.

At least one aspect is directed to a method. The method can include providing an electrical connector assembly. The electrical connector assembly can include a connector extending into an opening of a housing. The electrical connector assembly can include a retention member to engage a notch of the housing to couple the connector to the housing. The retention member can be engageable by a prong of an extraction tool to separate the housing from the connector. The prong of the extraction tool can include a tip to guide the prong between the connector and the housing without damaging the connector or the housing.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
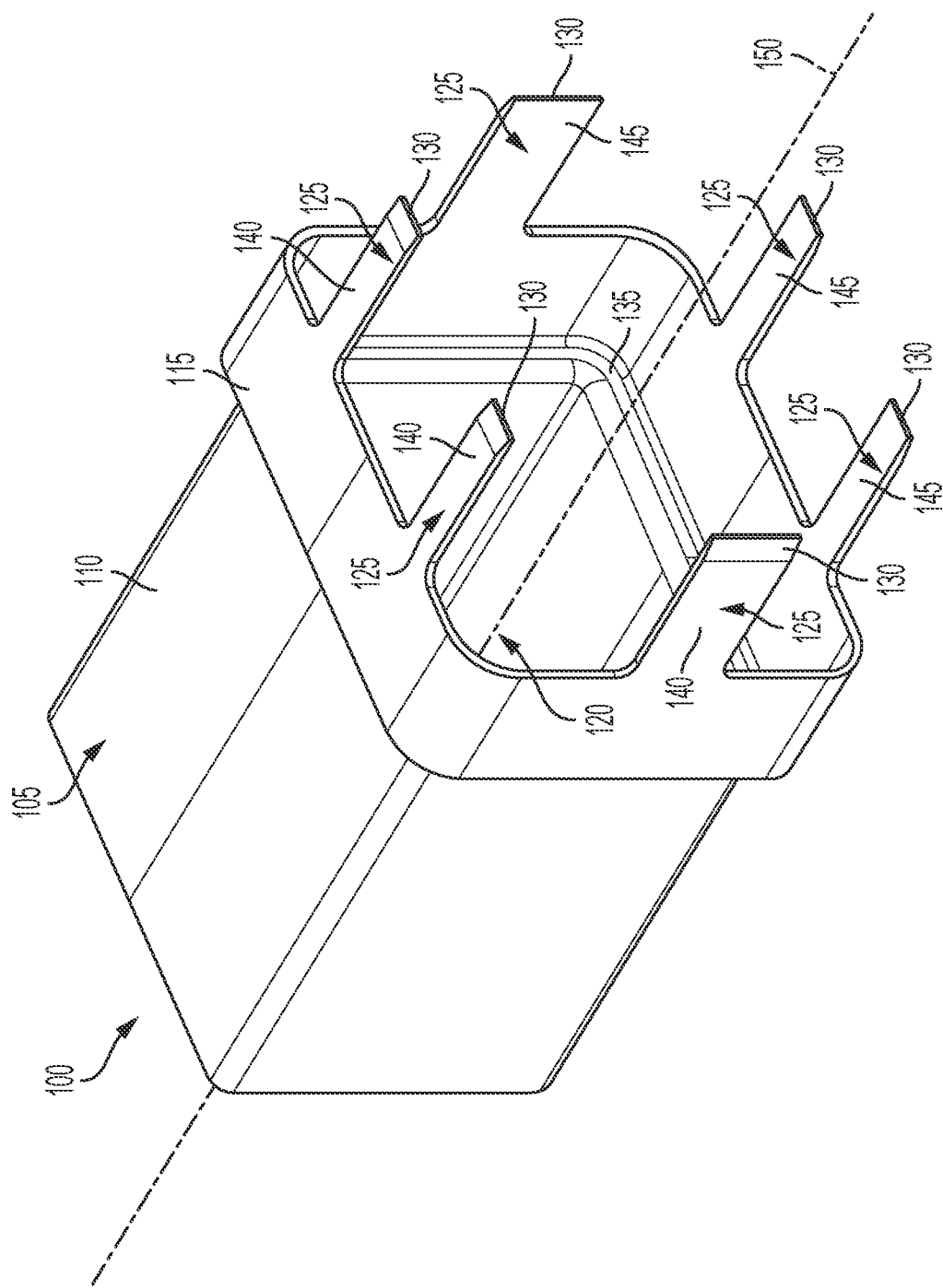
FIG. 1 depicts an example extraction tool, in accordance with some aspects.
Figure 2:
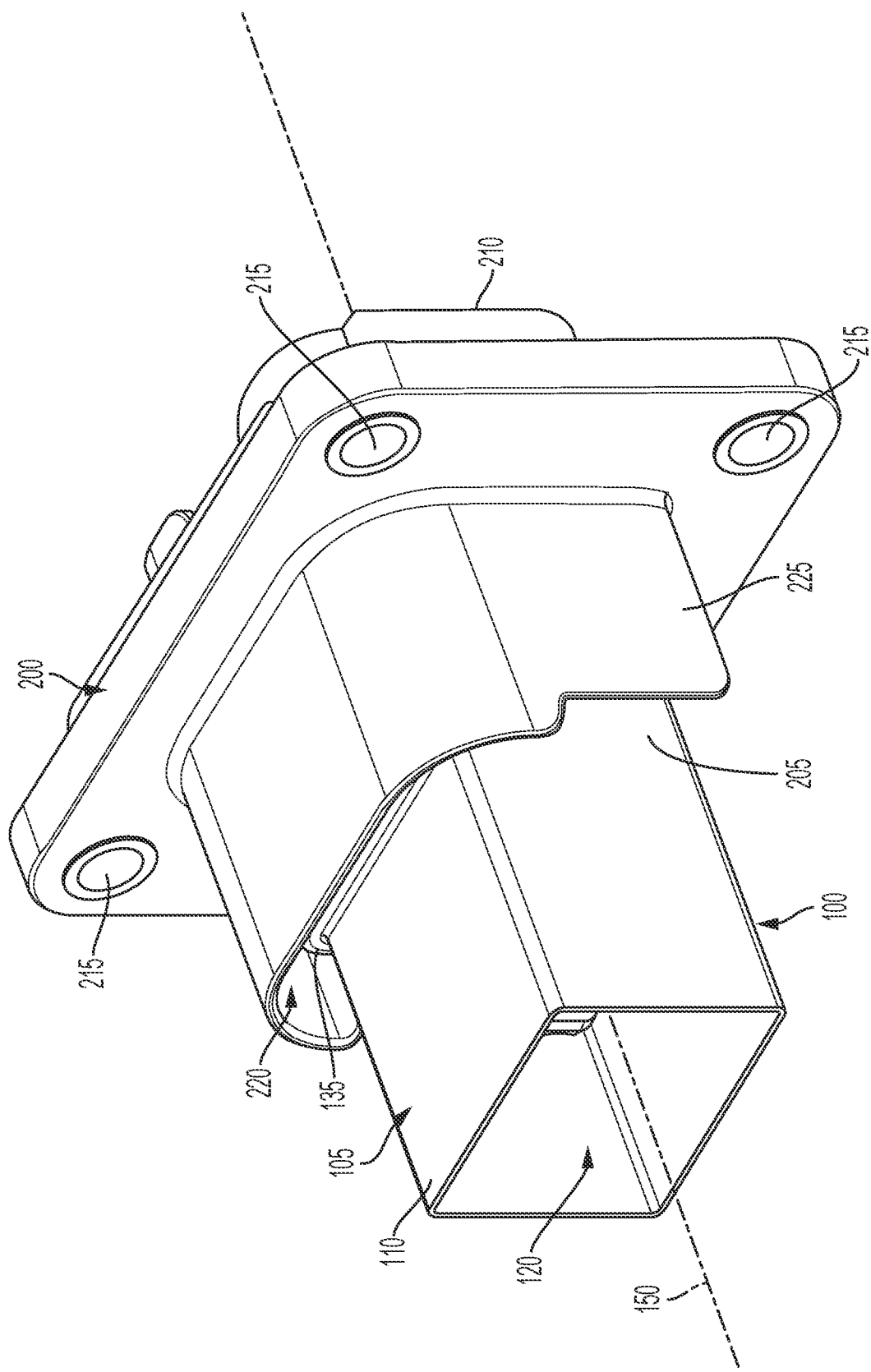
FIG. 2 depicts an example extraction tool, in accordance with some aspects.

Following below are more detailed descriptions of various concepts related to, and implementations of, methods, apparatuses, and systems of electrical connector service, maintenance, or replacement. The various concepts introduced above and discussed in greater detail below may be implemented in any of numerous ways.

The present disclosure is directed to apparatuses, systems, and methods of extracting electrical connector housings. For example, an electric vehicle can include at least one electrical connector. The electrical connector can electrically couple at least one battery pack, battery module, or battery cell with a drive unit, electric motor, or other electrical component or system of the electric vehicle. For example, the connector can be coupled with a battery pack via a connector housing. The housing can define an opening. The connector can extend into the opening of the housing. One or more retention members can couple the connector to the housing. The housing can be coupled with the connector in a manner that prohibits or prevents the connector from separating from the housing without damage to either component in absence of an extraction tool.

The disclosed solutions have a technical advantage of separating a connector from a housing without damaging either component. For example, at least one extraction tool can separate the housing from the connector without damaging the connector or the housing. The extraction tool can include a hollow body defining an opening. The extraction tool can include at least one prong extending from the body of the extraction tool (e.g., extending axially from the body). The prong can engage the retention member to cause the retention member to disengage the housing. The housing can be separated from the connector with the prong of the extraction member engaging the retention member. For example, the prong can engage the retention member to cause (e.g., move, force, bend, flex, push) the retention member to disengage from the housing. The retention member can be part of a shield. For example, a shield can be disposed between the connector and the housing. The shield can include at least one first retention member to couple the shield with the housing and at least one second retention member to couple the shield with the connector. The first retention member and the second retention member, when respectively engaged with a housing and a connector, can cause the connector to be coupled with the housing.

The prong can include a tapered tip (e.g., a tip portion of the prong angles inward, outward, or in some other direction) to guide the prong between the housing and the connector to disengage the housing from the connector. The extraction tool can include multiple prongs. Each prong can extend axially away from the body. For example, each prong of the extraction tool can simultaneously or substantially simultaneously (e.g., within 1 second, within five seconds) engage multiple retention members to separate the housing from the connector. The body can include a first portion having a first width (e.g., diameter, dimension). The body can include a second portion having a second width (e.g., diameter, dimension). The difference in width (e.g., diameter, dimension) between the first portion and the second portion can define a shoulder portion. The shoulder portion can extend from the first portion to the second portion in a direction that is perpendicular or substantially perpendicular (e.g., ±30°) with the prong. The shoulder portion can contact (e.g., abut, touch) the connector or the shield with the prong engaging the retention member. The shoulder portion can apply a force (e.g., provide leverage) against the connector or the shield to facilitate removal of the housing from the connector.

FIG. 1, among others, depicts an apparatus 100. The apparatus 100 can be or include an extraction tool 100. The extraction tool 100 can include a body 105. The body 105 can define an opening 120. The body 105 can extend along an axis 150 of the extraction tool 100. The extraction tool 100 can include the body 105 having a first portion 110 and a second portion 115. The first portion 110 and the second portion 115 can extend along the axis 150. For example, the first portion 110 and the second portion 115 can be coaxial along the axis 150. The opening 120 can extend through the first portion 110 and the second portion 115. For example, the first portion 110 and the second portion 115 can be hollow members such that the opening 120 extends completely through the first portion 110 and the second portion 115 of the body 105. The opening 120 can extend through the entire body 105 such that the body 105 is hollow. The first portion 110 and the second portion 115 can each include at least one inner wall and at least one outer wall. For example, the opening 120 can be defined by the inner wall(s) of the first portion 110 or the inner wall(s) of the second portion 115.

The extraction tool 100 can include the body 105 including the first portion 110 having a first dimension and the second portion having a second dimension. For example, the first dimension can be a distance from one inner wall of the first portion 110 to an opposite inner wall to define a height or width of the opening 120 within the first portion 110 with the first portion 110 having a generally rectangular or square cross-sectional shape. The first dimension can be a diameter of the opening 120 within the first portion 110 with the first portion 110 having a circular, ovular, or otherwise rounded cross-sectional shape. The second dimension can be a distance from one inner wall of the second portion 115 to an opposite inner wall to define a height or width of the opening within the second portion 115, for example. The second dimension can be a diameter of the opening 120 within the second portion 115 with the second portion 115 having a circular, ovular, or otherwise rounded cross-sectional shape. The first dimension of the first portion 110 and the second dimension of the second portion 115 can be substantially constant (e.g., ±15% variance) along a length of the body 105. For example, the first dimension of the first portion 110 can be constant such that a width or diameter of the opening 120 within the first portion 110 constant. The second dimension of the second portion 115 can be constant such that a width or diameter of the opening 120 within the second portion 115 can be constant. The first dimension of the first portion 110 and the second dimension of the second portion 115 can be constant along a length of the body 105 with the first portion 110 and the second portion 115 being coaxial along the axis 150 of the extraction tool 100. For example, a wall of the first portion 110 can be parallel with a wall of the second portion 115 with the first portion 110 and the second portion 115 coaxial along the axis 150.

The extraction tool 100 can include the body 105 including a shoulder portion 135. For example, the body 105 can include the shoulder portion 135 between the first portion 110 and the second portion 115. The shoulder portion 135 can be or include a wall. For example, wall of the shoulder portion 135 can include a wall having a wall thickness equal to or approximately equal to (e.g., ±30%) the wall thickness of the first portion 110 or the second portion 115. The shoulder portion 135 can be coupled with (e.g., integrated with, continuous with, adjacent to) the first portion 110 of the body 105. The shoulder portion 135 can be coupled with (e.g., integrated with, continuous with, joined with, adjacent to) the second portion 115 of the body 105. For example, the body 105 can include the shoulder portion 135 positioned in between the first portion 110 and the second portion 115 where the first portion 110, the second portion 115, and the shoulder portion 135 can be coupled together or integrated as unitary (e.g., singular, cohesive) structure, as depicted in FIG. 1, among others. The extraction tool 100 can be a one-piece structure having the body 105 including the first portion 110, the second portion 115, the shoulder portion 135, and other portions or component molded, machined, or cast together. A wall of the first portion 110, a wall of the shoulder portion 135, a wall of the second portion 115, and other portions of the extraction tool 100 can be integrally formed.

The extraction tool 100 can include the first dimension of the first portion 110 being less than the second dimension of the second portion 115 to define the shoulder portion 135. The first portion 110 can include a first dimension (e.g., an inner diameter or a distance between opposing inner walls) that is less than the second dimension (e.g., an inner diameter or a distance between opposing inner walls) of the second portion 115 such that the opening 120 can be wider within the second portion 115 than within the first portion 110. The shoulder portion 135 can be a portion of the body 105 of the extraction tool 100 that connects (e.g., is positioned between and is coupled to) the first portion 110 having the first dimension and the second portion 115 having the second dimension. The extraction tool 100 can include the shoulder portion 135 angled relative to the first portion 110 or the second portion 115 with the first dimension of the first portion 110 being less than the second dimension of the second portion 115. For example, the shoulder portion 135 can extend perpendicularly from the first portion 110 to the second portion 115. The shoulder portion 135 be angled from the first portion 110 towards the second portion 115 at some other angle (e.g., an 80-degree angle, a 60-degree angle, a 45-degree angle, or some other angle). The shoulder portion 135 can connect (e.g., be positioned between and coupled with) the first portion 110 and the second portion 115 of the body 105 with a wall of shoulder portion 135 including a length that is approximately equal to (e.g., ±30%) of a difference between the first dimension of the first portion 110 and the second dimension of the second portion 115. For example, the length of the wall of the shoulder portion 135 can be equal to the difference between the first dimension and the second dimension with the shoulder portion 135 extending perpendicularly from the first portion 110 or the second portion 115. The length of the wall of the shoulder portion 135 can be greater than the difference between the first dimension and the second dimension with the shoulder portion 135 extending at some angle (e.g., 45 degrees) from the first portion 110 or the second portion 115.

Figure 9:
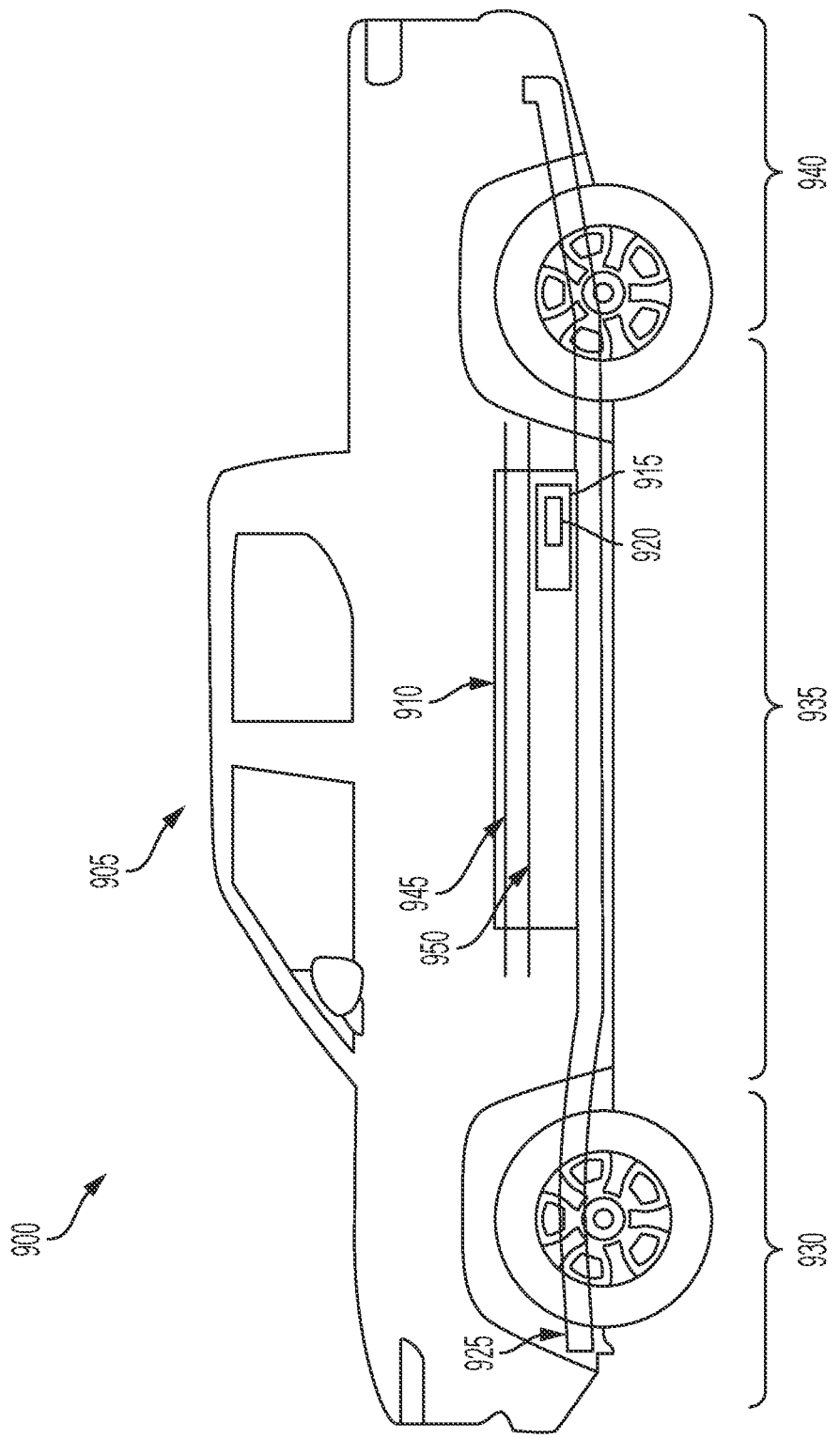
FIG. 9 depicts an example electric vehicle, in accordance with some aspects.
Figure 10:
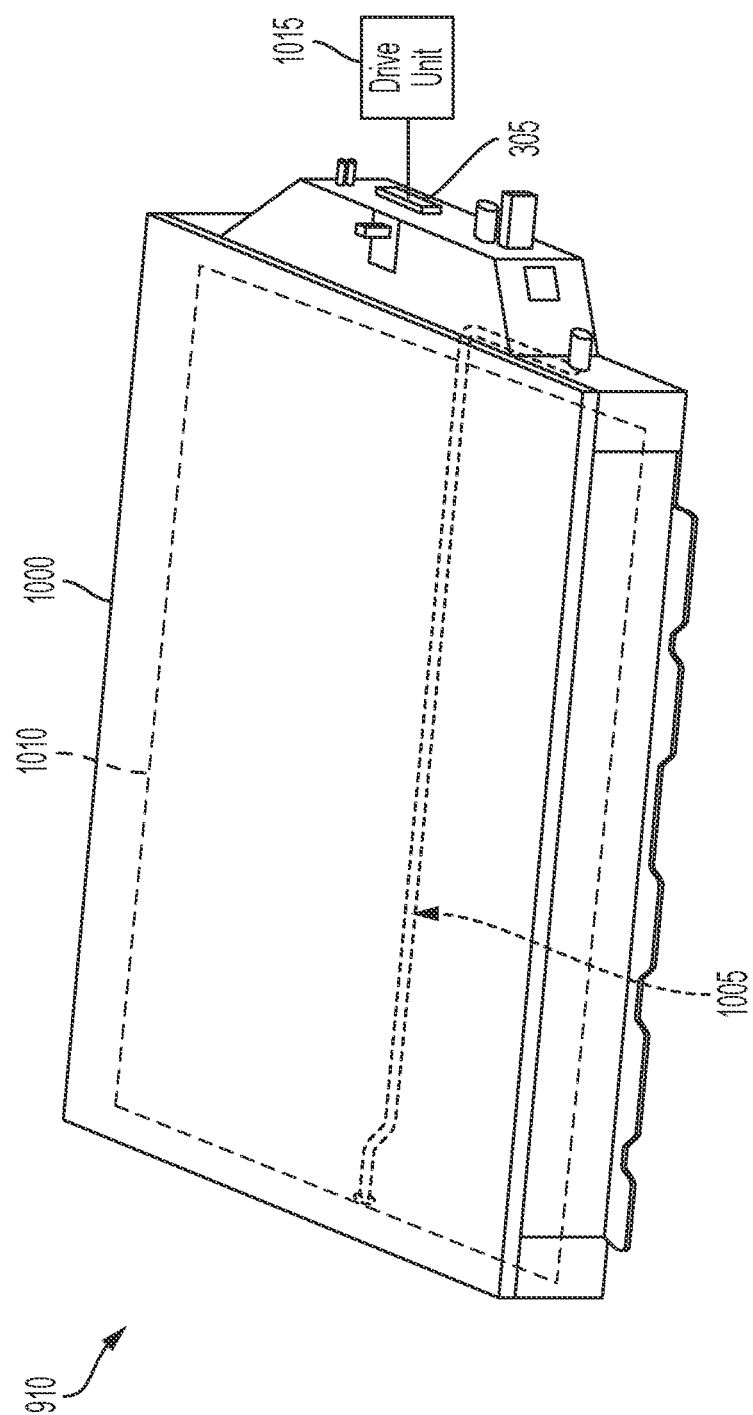
FIG. 10 depicts an example battery pack, in accordance with some aspects.

An electrical connector assembly 300 can include at least one connector housing 200, at least one connector 305, and at least one shield 310. The housing 200 can be a housing of an electrical connector, a battery, a battery pack, or some other device. For example, the housing 200 can be a housing of an electrical connector of a battery pack (e.g., the battery pack 910 as depicted in FIGS. 9-10 and as discussed below). The housing 200 include a first end 205, a second end 210, at least one aperture 215, at least one opening 220, and at least one side wall 225. For example, the housing 200 can include the opening 220 extending through the housing 200 from the first end 205 to the second end 210 with the at least one side wall 225 around the opening 220. The side wall 225 can extend completely around or partially around the opening. The opening 220 can extend from the first end 205 to the second end 210 along the axis 150. The opening 220 can include a rectangular, square, circular, ovular, or otherwise-shaped cross-sectional shape. The opening can include a cross-sectional shape that is continuous along the axis 150. For example, the opening 220 can include a dimension (e.g., a diameter of the opening 220, a distance from one side wall 225 of the housing 200 to an opposite side wall 225 of the housing 200) that is greater than the first dimension of the first portion 110 of the body 105 of the extraction tool 100 or and greater than the second dimension of the second portion1 115 of the body 105 of the extraction tool 100. The opening 220 can include a dimension (e.g., a diameter of the opening 220, a distance from one side wall 225 of the housing 200 to an opposite side wall 225 of the housing 200) to accommodate the connector 305. For example, a dimension of the connector 305 (e.g., a width, thickness, or diameter of the connector 305) can be less than a dimension of the housing 200.

Figure 7:
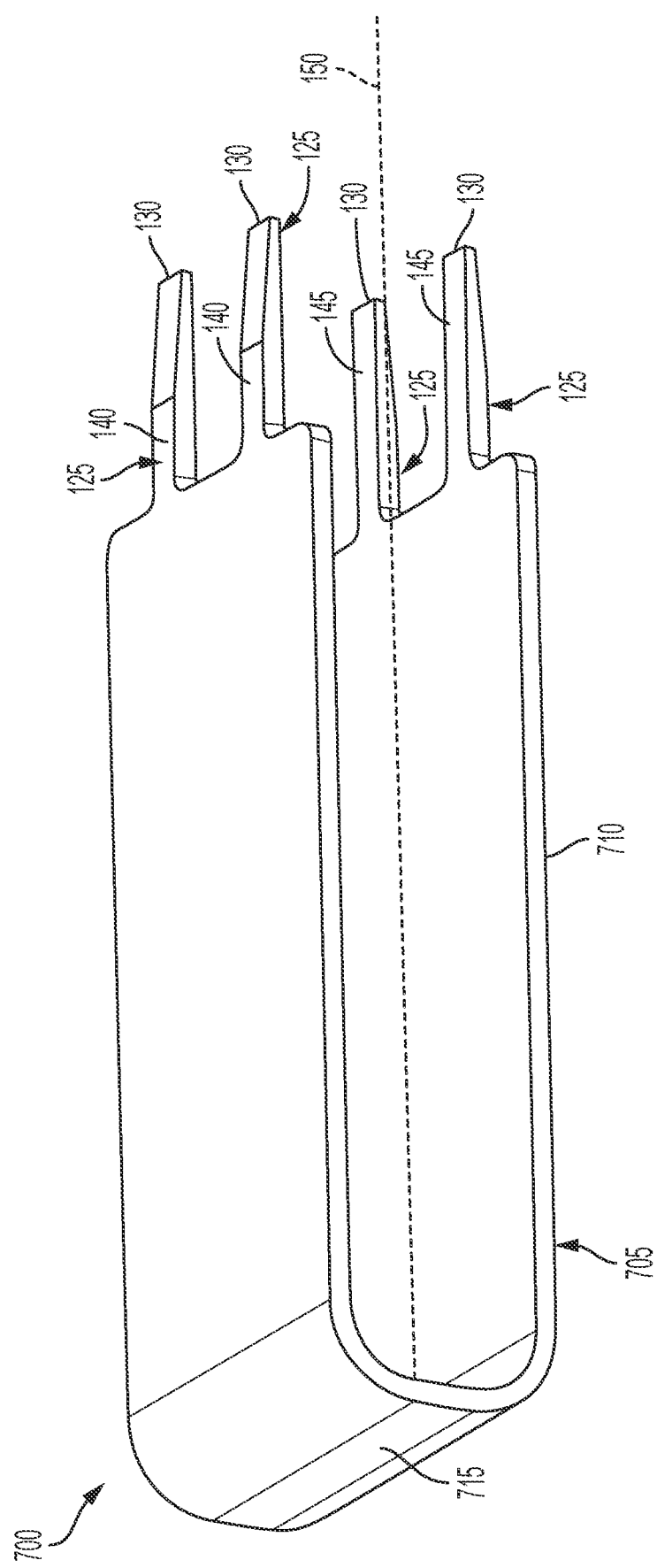
FIG. 7 depicts an example extraction tool, in accordance with some aspects.

The aperture 215 of the housing 200 can facilitate a coupling (e.g., mounting, mating, fastening, joining, or otherwise coupling) the housing 200 to some other object, such as a battery pack (e.g., the battery pack 910 of the electric vehicle 905 as depicted in FIG. 7, among others). For example, the housing 200 can include one or more apertures 215 to receive a fastener (e.g., a screw, bolt, shaft, rivet, pin, or other fastener) to secure the housing 200 to some other object. A fastener (e.g., a threaded screw) can be inserted through the aperture 215 and can be threaded to another object (e.g., a threaded hole of a battery pack 910) with a portion of the housing (e.g., the side wall 225 defining the aperture) captured between a head of the fastener and the object to which the fastener is fastened. For example, the housing 200 can be physically coupled with a battery pack or other object with fasteners received in the aperture 215. Rather than including the aperture 215, the housing 200 can define a fastener to couple the housing 200 with another object. For example, the housing 200 can include or define a threaded shank extending from the housing 200, the threaded shank too couple with a threaded hole of another object (e.g., a battery pack). The housing 200 can be coupled with another object with the connector 305 positioned at least partially within the opening 220 of the housing 200.

Figure 8:
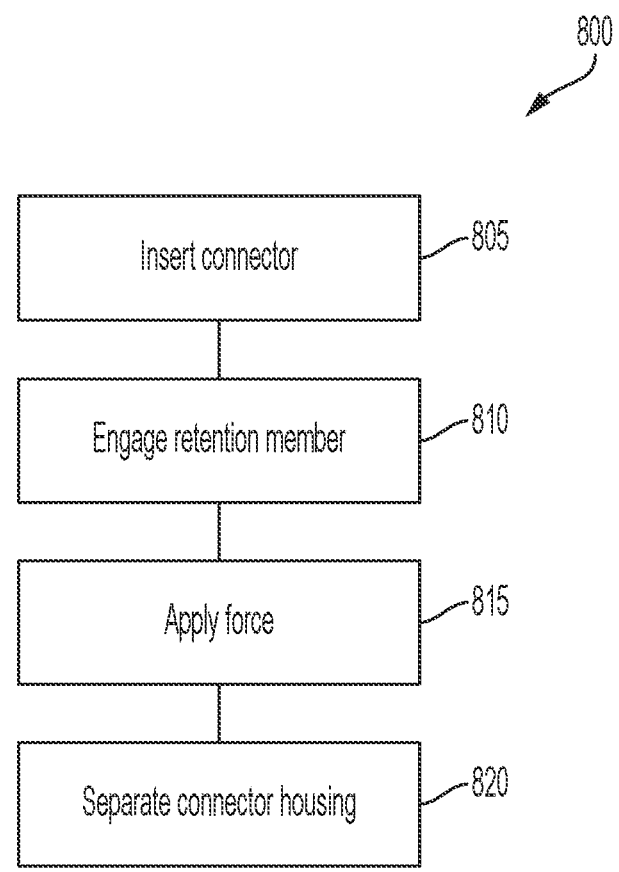
FIG. 8 is a flow chart of a method for separating a housing from an electrical connector, in accordance with some aspects.

The connector 305 can be an electrical connector to facilitate an electrical connection between two objects. For example, the connector 305 can be an electrical connector 305, such as a high-voltage (e.g., 100V, 400V, 800V, greater than 800V, or some other voltage) connector to facilitate the electrical coupling of one component with another. The connector 305 can facilitate the detachable electrical coupling of one component with another. For example, the connector 305 can be electrically coupled with one component, and a second component can detachably (e.g., removably) couple with the connector 305 to establish an electrical connection between the first component and the second component. The connector 305 can include one or more electrical contact points or current collectors within at least one slot, aperture, opening, or space to contact a prong, lead, pin, or other electrically conductive member of an object (e.g., a drive unit 1015 of an electric vehicle 905) to detachably electrically couple the object with the connector 305. As depicted in FIGS. 7 and 8, among others, the connector 305 can electrically couple at least one battery pack 910 of an electric vehicle 905 with at least one drive unit 1015 of the electric vehicle 905 to power the drive unit 1015. The connector 305 can facilitate an electrical connection between the battery pack 910 of the electric vehicle 900 and the drive unit 1015. For example, the connector 305 can be mounted to (e.g., positioned on, physically coupled with) and electrically coupled with the battery pack 910. The housing 200 can facilitate the mounting of the connector 305 to the battery pack 910. For example, the connector 305 can be coupled with the housing 200 via at least one retention member 375.

The connector 305 can include a first portion 315 including a first end 320 and at least one side 325. The connector 305 can include a second portion 330 including a second end 335, a side 340, and a wall 345. For example, the first end 320 of the connector 305 can include at least one electrical contact point or current collector for detachably electrically coupling the connector 305 with a first object (e.g., a drive unit 1015 of an electric vehicle 905 or some other electrically-powered device). The second end 335 can include at least one electrical contact point or current collector to electrically couple the connector 305 with a second object (e.g., a battery pack 910 of an electric vehicle 905. The first object (e.g., a drive unit 1015) can be electrically coupled with the second object (e.g., a battery pack 910) via the connector 305 with the first object electrically coupled with the first end 320 and the second object electrically with the second end 335 of the connector 305.

The side 325 of the first portion 315 of the connector 305 can be positioned between the first end 320 and the wall 345. For example, the connector 305 can include the side 325 extending along the axis 150 from the first end 320 to the wall 345. The first portion 315 of the connector 305 can include a dimension (e.g., a diameter of the connector 305 or a distance from one side 325 of the connector 305 to an opposite side 325). The dimension of the first portion 315 can be less than a dimension of the opening 220 of the housing 200 (e.g., a diameter of the opening 220, a distance from one side wall 225 of the housing 200 to an opposite side wall 225 of the housing 200). For example, the first portion 315 of the connector 305 can extend along the axis 150 into the opening 220 of the housing 200. The side 325 can be parallel with the axis 150 or can be angled with respect to the axis 150. For example, side 325 can include at least one portion (e.g., a length) that is parallel with the axis 150. The side 325 can include at least one portion that is non-parallel with (e.g., angled with respect to) the axis 150. For example, the side 325 can include a portion (e.g., a length of the side 325) that is parallel with the axis 150 and a second portion (e.g., a length of the side 325) that is angled with respect to the axis 150 such that a side profile of the connector 305 can be non-linear, curved, stepped, or shaped otherwise.

The connector 305 can include the first portion 315 extending into the opening 220 of the housing 200. For example, the connector 305 can include the first portion 315 extending into the opening 220 and the second portion 330 protruding from (e.g., extending out of, not within) the opening 220 of the housing 305. For example, the connector 305 can be coupled with the housing 200 with the wall 345 of the connector 305 supported by (e.g., contacting, touching, positioned against) the second end 210 of the housing 200. The second portion 330 of the connector 305 can include a second dimension (e.g., a diameter of the second portion, a distance from one side 340 to an opposing side 340) that is greater than a dimension of the opening 220. For example, the second portion 330 can be wider or larger than the opening 220 such that the second portion 330 cannot fit into the opening 220. The wall 345 of the second portion 330 of the connector 305 can extend outwardly at an angle with respect to the axis 150 between the first portion 315 and the second portion 330. For example, the wall 345 of the connector 305 can contact the second end 210 of the housing 200 with the first portion 315 fully inserted within the housing 200. The wall 345 of the connector 305 can contact the second end 210 of the housing 200 directly or with some intervening component positioned therebetween (e.g., a shield 310 or other component).

The connector 305 can be coupled with the housing 200 via at least one retention member 375. For example, the connector 305 can include at least one retention member 375 to engage a retaining groove 365 (e.g., notch, slot, depression, indent) of the housing 200. The retaining groove 365 of the housing 200 can be formed within the opening 220 such that the retention member 375 can engage the groove 365 with the first portion 315 of the connector 305 within the opening 220. The housing 200 can include at least one retention member 360 to engage a retaining groove 350 of the connector 305. At least one retention member 360 or 350 can engage a retaining groove 350 of the connector 305 of a retaining groove 365 of the housing 200, respectively, to couple the connector 305 with the housing.

Figure 3:
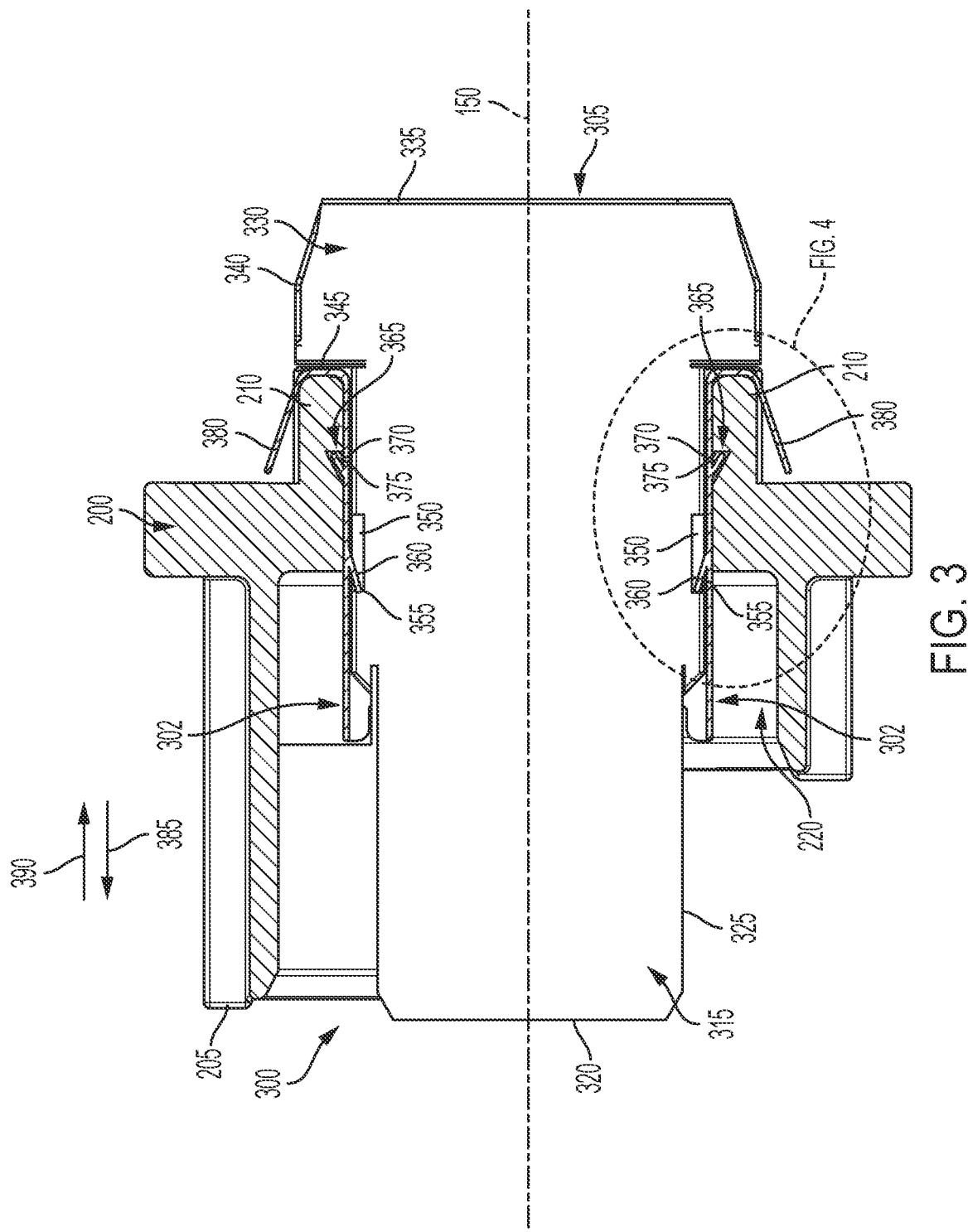
FIG. 3 depicts an example housing for an electrical connector, in accordance with some aspects.
Figure 4:
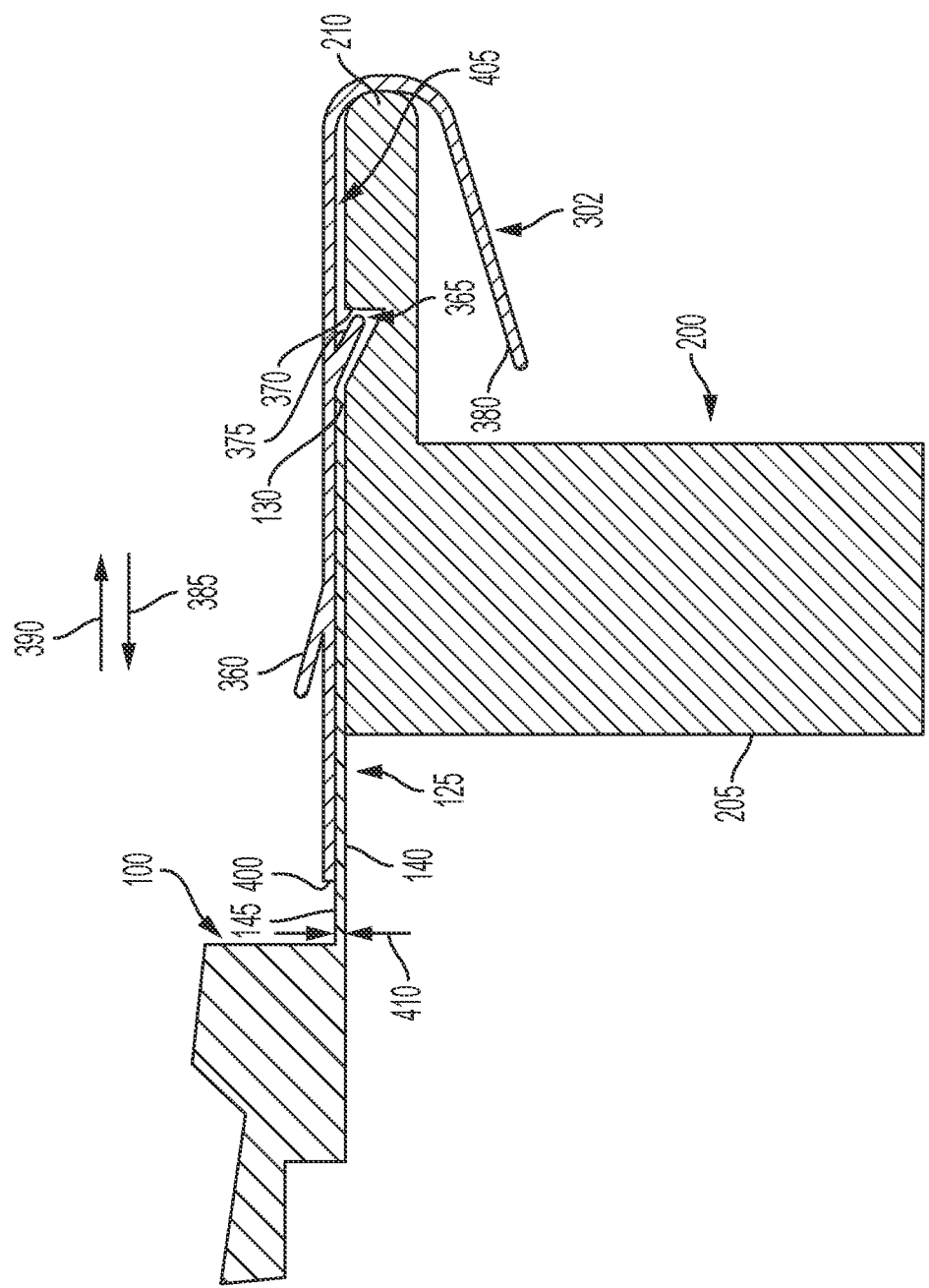
FIG. 4 depicts an example housing for an electrical connector, in accordance with some aspects.
Figure 5:
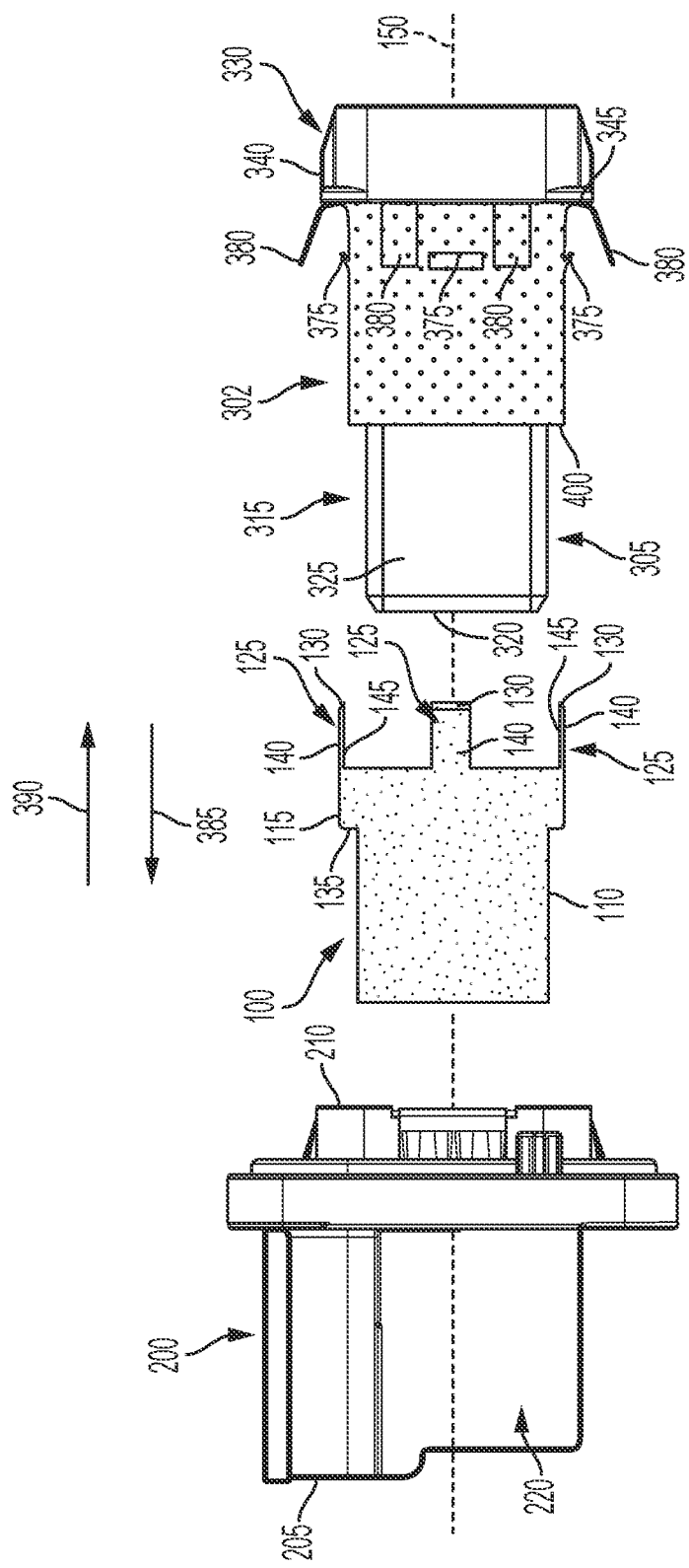
FIG. 5 depicts an example extraction tool for separating a housing from an electrical connector, in accordance with some aspects.

The connector 305 can be coupled with the housing 200 with a shield 310 disposed between the housing 200 and the connector 305. For example, the shield 310 can be positioned around the connector 305 with the connector 305 inserted into the opening 220 of the housing 200. The shield 310 can be at least partially positioned within the opening 220 of the housing 200 with the first portion 315 of the connector 305 at least partially extending into the opening 220. As depicted in FIGS. 3-5, the shield 310 can include the retention member 360, the retention member 375, an outer portion 380, and an end 385. The shield 310 can include the retention member 360 to retain the connector 305. For example, the retention member 360 of the shield 310 can engage the connector 305 to couple the connector with the shield 310 or the housing 200. The shield 310 can include the retention member 375 to retain the housing 200. For example, the retention member 375 of the shield 310 can engage the housing 200 to couple the housing 200 with the shield 310 or with the connector 305.

The outer portion 380 can extend around the second end 210 of the housing 200 with the shield 310 positioned within the housing 200. For example, the outer portion 380 can be positioned around the second end 210 of the housing 200 with the retention member 375 of the shield engaged with the housing 200 to retain the housing 200. The outer portion 380 can be positioned between the wall 345 of the connector 305 and the second end 210 of the housing 200 with the housing 200 coupled with the connector 305 and with the shield 310 positioned between the connector 305 and the housing 200. The shield 310 can be or include a metallic material to provide an electrical ground between the connector 305 and the housing 200.

The shield 310 can couple (e.g., secure, join, mate) the connector 305 with the housing 200. For example, the retention member 375 can engage the housing 200 to prevent a movement of the housing 200 in a first direction 390 relative to the shield 310. The retention member 360 of the shield 310 can engage the connector 305 to prevent movement of the connector in a second direction 395 relative to the shield 310. The outer portion 380 of the shield 310 can contact the second end 210 of the housing 200 to prevent a movement of the housing 200 in the second direction 395 relative to the shield 310. The outer portion 380 of the shield 310 and the second end 210 of the housing 200 can contact the wall 345 of the connector 305 to prevent a movement of the connector 305 in the first direction 390 relative to the shield 310. Neither the housing 200 nor the connector 305 can move in the first direction 390 or the second direction 395 with the housing 200 coupled with the shield 310 and with the shield 310 simultaneously coupled with the connector 305.

The retention member 375 can be a prong, protrusion, extension, or finger extending from the connector 305 or the shield 310 to engage the retaining groove 365 of the housing 200 to couple the connector 305 with the housing 200. For example, the connector 305 or the shield 310 can be or include the retention member 375 to engage the retaining groove 365 of the housing 200. The retention member 375 can extend at an angle with respect to the axis 150 to engage the retaining groove 365. For example, the retention member 375 can extend at an angle less than 90 degrees (e.g., 45 degrees, 30 degrees, 60 degrees, or some other angle) to engage the retaining groove 365. The retention member 375 can extend in a direction having a vertical component (e.g., a component perpendicular to the axis 150 and a horizontal component (e.g., a vector parallel to the axis 150), where the horizontal component can be in the second direction 395. For example, the retention member 375 can extend at an angle in the second direction 395 (e.g., a direction from the first end 205 of the housing 200 towards the second end 210).

The retention member 375 can be a flexible member that can be depressed to disengage the retaining groove 365. For example, the retention member 375 can be or include a spring or can include a spring constant such that the retention member 375 is biased to an angled position. When the retention member 375 is released from a depressed, bent, or rotated position (e.g., a position parallel with the axis 150), the retention member 375 can spring back to an angled position with respect to the axis 150. The retention member 375 can be bent as the housing 200 sides over the connector 305 or shield 310 such that the retention member 375 is parallel or substantially parallel (e.g., ±25 degrees) with the axis 150. For example, the housing 200 can move in the direction 395 relative to the retention member 375 to cause the retention member 375 to be bent, depressed, or rotated. The retention member 375 can remain bent as the housing 200 moves over the retention member 375 with the retention member pressing against (e.g., by spring force) an inner wall defining the opening 220. The retention member 375 can spring back to an angled position (e.g., angled at 45 degrees with respect to the axis 150) with the retention member 375 positioned at the retaining groove 365. For example, the retaining groove 365 can be a recess (e.g., notch, indentation, depression) within the housing 200 that can release (e.g., remove a downward force against) the retention member 375, whereupon the retention member 375 can spring back to an angled position. The retention member 375 can be in the angled position (e.g., angled in the second direction 395) with the retention member 375 coupling the connector 305 or the shield 310 to the housing 200

The retention member 375 can retain the housing 200 with the retention member 375 in an angled position within the retaining groove 365. For example, as depicted in FIGS. 3 and 4, among others, the housing 200 can include or define the retaining groove 365. The retaining groove 365 can include at least one wall 370. The wall 370 can be perpendicular to the axis 150 or can be angled with respect to the axis (e.g., at an angle that matches the angle of the retention member 375 relative to the axis). The retention member 375 can be positioned within the retaining groove 365 and positioned near (e.g., within 1 mm, within 5 mm) of the wall 370 with the retention member 375 in the angled position. Because the retention member 375 can be angled in the second direction 395 within the groove 365, the retention member 375 can prevent the housing 200 from moving in the first direction 390 relative to the retention member 375. For example, the retention member 375 can contact (e.g., collide with, crash into, press against) the wall 370 of the retaining groove 365 to prevent the housing 200 from moving in the first direction 390 relative to the retention member 375 with the retention member 375 in the angled position within the groove 365.

The retention member 360 can be a prong, protrusion, extension, or finger extending from the housing 200 or the shield 310 to engage with the retaining groove 350 of the connector 305 to couple the connector 305 with the housing 200. For example, the housing 200 can be or include the retention member 360 to engage the retaining groove 350 of the connector 305. The retention member 360 can extend at an angle with respect to the axis 150 to engage the retaining groove 350. For example, the retention member 360 can extend at an angle less than 90 degrees (e.g., 45 degrees, 30 degrees, 60 degrees, or some other angle) to engage the retaining groove 350. The retention member 360 can extend in a direction having a vertical component (e.g., a component perpendicular to the axis 150 and a horizontal component (e.g., a vector parallel to the axis 150), where the horizontal component can be in the first direction 390. For example, the retention member 360 can extend at an angle in the first direction 390 (e.g., a direction from the second end 335 of the connector 305 towards the first end 320).

The retention member 360 can be a flexible member that can be depressed to disengage the retaining groove 350. For example, the retention member 360 can be or include a spring or can include a spring constant such that the retention member 360 is biased to an angled position. When the retention member 360 is released from a depressed, bent, or rotated position (e.g., a position parallel with the axis 150), the retention member 360 can spring back to an angled position with respect to the axis 150. The retention member 360 can be bent as the connector 305 sides within the housing 200 or shield 310 such that the retention member 360 is parallel or substantially parallel (e.g., ±25 degrees) with the axis 150. For example, the connector 305 can move in the direction 390 relative to the retention member 360 to cause the retention member 360 to be bent, depressed, or rotated. The retention member 360 can remain bent as the connector 305 moves over the retention member 360 with the retention member pressing against (e.g., by spring force) the side 325 of the connector 305. The retention member 360 can spring back to an angled positon (e.g., angled at 45 degrees with respect to the axis 150) with the retention member 360 positioned at the retaining groove 350. For example, the retaining groove 350 can be a recess (e.g., notch, indentation, depression) within the first portion 315 of the connector 305 that can release (e.g., remove a downward force against) the retention member 360, whereupon the retention member 360 can spring back to an angled position. The retention member 360 can be in the angled position (e.g., angled in the first direction 390) with the retention member 360 coupling the housing 200 or the shield 310 to the connector 305

The retention member 360 can retain the connector 305 with the retention member 360 in an angled position within the retaining groove 350. For example, as depicted in FIGS.

3 and 4, among others, the connector 305 can include or define the retaining groove 350. The retaining groove 350 can include at least one wall 355. The wall 355 can be perpendicular to the axis 150 or can be angled with respect to the axis (e.g., at an angle that matches the angle of the retention member 360 relative to the axis 150). The retention member 360 can be positioned within the retaining groove 350 and positioned near (e.g., within 1 mm, within 5 mm) of the wall 355 with the retention member 360 in the angled position. Because the retention member 360 can be angled in the first direction 390 within the groove 350, the retention member 360 can prevent the connector 305 from moving in the second direction 395 relative to the retention member 360. For example, the retention member 360 can contact (e.g., collide with, crash into, press against) the wall 355 of the retaining groove 350 to prevent the connector 305 from moving in the second direction 395 relative to the retention member 360 with the retention member 360 in the angled position within the groove 350.

The connector 305 can be coupled with the housing 200 with a gap 400 between the connector 305 and the housing 200. For example, the connector 305 can be coupled with the housing 200 with the gap 400 between the shield 310 and the housing 200. The connector 305 can be coupled with the housing 200 with the gap 400 between the shield 310 and the connector 305. The connector 305 can be coupled with the housing 200 with the gap 400 between the side 325 of the connector 305 and the shield 310 or the housing 200. The gap 400 can be created when a thin member (e.g., a prong) is positioned between the connector 305 and the housing 200, between the connector 305 and the shield 310, or between the housing 200 and the shield 310. For example, insertion of a prong between the shield 310 and the housing 200 can create the gap 400, where the gap 400 can allow the prong to advance (e.g., fit) between the shield 310 and the housing 200.

The extraction tool 100 can include at least one prong 125. For example, the extraction tool 100 can include one prong 125, two prongs 125, six prongs 125, or some other number of prongs 125. The prong 125 can extend from the second portion 115 of the body 105. For example, the prong 125 can extend axially (e.g., parallel with the axis 150) from the second portion 115 of the body 105 in a direction away from the first portion 110. The prong 125 can be a long, thin, slender member extending away from the second portion 115 with a thickness approximately (e.g., ±25%) equal to the gap 400 between the connector 305 and the housing 200, between the connector 305 and the shield 310, or between the housing 200 and the shield 310. For example, the prong 125 can include a thickness 405 that is approximately (e.g., ±25%) equal to the gap 400. The prong 125 can be inserted between the connector 305 and the housing 200, between the connector 305 and the shield 310, or between the housing 200 and the shield 310.

The prong 125 can extend between the connector 305 and the housing 200, between the connector 305 and the shield 310, or between the housing 200 and the shield 310 with the connector 305 coupled with the housing 200. For example, the connector 305 can be coupled with the housing 200 (via the shield 310 or directly) via at least one retention member 360, 375 with the first portion 315 of the connector 305 extending into the opening 220 of the housing 200. The prong 125 of the extraction tool 100 can be inserted into the opening 220 of the housing from the first end 205 of the housing 200. For example, the prong 125 and the second portion 115 of the extraction tool 100 can be inserted within the opening 220 such that the housing 200 can be around the prong 125 and a portion of the body 105 (e.g., the second portion 115 or the first portion 110). The prong 125 can be provided around the connector 305. For example, the prong 125 can be inserted into the opening 220 of the housing 200 and around the first portion 315 of the connector 305 with the connector 305 at least partially extending into opening 220. The prong 125 can be inserted into the opening 220, around the first portion 315 of the connector 305, and between the connector 305 and the housing 200, between the connector 305 and the shield 310, or between the housing 200 and the shield 310.

The extraction tool 100 can include the prong 125 including an outer wall 140 and an inner wall 145. For example, the prong 125 can extend from the second portion 115 of the body 105 with the prong having a thickness 405 defined by the outer wall 140 and the inner wall 145. The inner wall 145 can be closer to the axis 150 than the outer wall 140 with the prong 125 extending from the second portion 115 away from the first portion 110, for example. The outer wall 140 of the prong 125 can contact an inner surface of the housing 200 or an inner surface of the shield 310. For example, the outer wall 140 can be positioned against an inner surface of the housing 200 with the prong 125 inserted between with the prong 125 inserted between the housing 200 and the connector 305 or between the housing 200 and the shield 310. The outer wall 140 of the prong 125 can be positioned against an inner wall of the shield 310 with the prong 125 inserted between the shield 310 and the connector 305. The inner wall 145 of the prong 125 can contact an outer surface of the connector 305 or an outer surface of the shield 310. For example, the inner wall 145 of the prong 125 can be positioned against the outer surface of the connector 305 with the prong 125 inserted between the connector 305 and the housing 200 (e.g., if the connector assembly 300 does not include a shield) or between the connector 305 and the shield 310. The inner wall 145 of the prong 125 can be positioned against an outer surface of the shield 310 with the prong 125 inserted between the housing 200 and the shield 310.

The extraction tool 100 can include the prong 125 including a tip 130. For example, the prong 125 can include the thickness 405 along a length of the prong 125. The tip 130 can be a distal end or distal portion of the prong 125. The tip 130 can include a thickness that is less than the thickness 405 of the prong 125. For example, the tip 130 can be tapered such that the thickness of the tip gradually (e.g., via a slope or curve) decreases from the thickness 405 to a point or to some lesser thickness. The tip 130 can include a taper angled inwards (e.g., from the outer wall 140 towards the inner wall 145). The tip 130 can include a taper angled outwards (e.g., from the inner wall 145 to the outer wall 140).

The prong 125 can include the tip 130 to guide the prong 125 between the connector 305 and the housing 200, between the connector 305 and the shield 310, or between the housing 200 and the shield 310. For example, the tip 130 can include the taper to guide the prong 125 and the tip 130 between the connector 305 and the housing 200, between the connector 305 and the shield 310, or between the housing 200 and the shield 310. The tip 130 or the taper of the tip 130 can cause a gap or a separation between the connector 305 and the housing 200, between the connector 305 and the shield 310, or between the housing 200 and the shield 310. For example, the tip 130 or the taper of the tip 130 can cause create a separation between the connector 305 and the housing 200, between the connector 305 and the shield 310, or between the housing 200 and the shield 310 to allow the prong 125 to respectively fit between the connector 305 and the housing 200, between the connector 305 and the shield 310, or between the housing 200 and the shield 310. The tip 130 or the taper of the tip 130 can expand a gap between the connector 305 and the housing 200, between the connector 305 and the shield 310, or between the housing 200 and the shield 310 until the gap is approximately (e.g., ±25%) equal to the gap 400 to allow the prong 125 to advance into (e.g., extend into, move within) the gap 400.

The extraction tool 100 can include the prong 125 including the tip 130 to disengage at least one retention member to separate a housing from a connector. For example, the extraction tool 100 can include the prong 125 including the tip 130 to disengage a retention member 360, 375 to separate a housing 200 from a connector 305. The retention member 375 can extend from the connector 305 or the shield 310 to engage a retaining groove 365 of the housing 200. The retention member 375 can be disengaged from the retaining groove 365 of the housing 200 with the retention member 375 bent, flexed, rotated, or pushed in the second direction 395. The retention member 375 can be engageable by the prong 125 of the extraction tool 100. For example, the prong 125 of the extraction tool 100 can extend within the opening 220 of the housing 200 and around the first portion 315 of the connector 305 with the prong 125 extending between the housing 200 and the connector 305 or between the housing 200 and the shield 310. For example, the extraction tool 100 can include the prong 125 including the tip 130 to disengage the retention member 375 to separate the housing 200 from the connector 305 with the housing 200 around a portion of the body 105 of the extraction tool 100. The housing 200 can be positioned around the second portion 115 of the body 105 of the extraction tool 100 with the prong 125 engaging the retention member 375. The prong 125 can extend between the housing 200 and the connector 305 or between the housing 200 and the shield 310 at a length sufficient to contact the retention member 375.

As the prong 125 advances (e.g., moves) between the housing 200 and the connector 305 or between the housing 200 and the shield 310, the tip 130 of the prong 125 can contact the retention member 375 to bend, flex, rotate, or push the retention member 375 from the angled position (e.g., a position in which the retention member 375 engages the wall 370 of the retaining groove 365) to a disengaged position (e.g., a flattened or un-angled position in which the retention member 375 is released from engagement with the wall 370 of the retaining groove 365). The prong 125 of the extraction tool 100 can contact the retention member 375 to cause the retention member 375 to disengage (e.g., be moved out of engagement with) the retaining groove 365 of the housing 200 and correspondingly disengage the housing 200 from the connector 305 or the shield 310. For example, the housing 200 can be separated (e.g., disengaged) from the connector 305 or the shield 310 with the prong 125 engaging (e.g., contacting, bending, flexing, rotating, pushing) the retention member 375.

As depicted in FIGS. 4 and 5, among others, the housing 200 can be removed from the connector 305 or the shield 310 with the retention member 375 engaged by the prong 125. For example, the housing 200 can be removed from the connector 305 or the shield 310 with the retention member 375 member disengaged from the retaining groove 365 by moving the housing 200 in the first direction 390 relative to the extraction tool 100, the connector 305, or the shield 310. The housing 200 can be removed from the connector 305 or the shield 310 by moving the housing 200 over the extraction tool 100 with the prong 125 of the extraction tool 100 engaging the retention member 375. The housing 200 can be positioned around the connector 305 with the extraction tool 100 extending into the opening 220 of the housing 200. For example, the extraction tool 100 can be provided into the opening 220 and around the first portion 315 of the connector 305 in the second direction 395 to contact, rotate, flex, bend, or push the retention member 375 out of engagement with the retaining groove 365, and the housing 200 can be removed over the extraction tool 100 in the first direction 390, as depicted in FIG. 5, among others.

The retention member 360 can extend form the housing 200 or the shield 310 to engage a retaining groove 350 of the connector 305. The retention member 360 can be disengaged from the connector 305 with the retention member 360 bent, flexed, rotated, pushed in the first direction 390. The retention member 360 can be engageable by the prong 125 of the extraction tool 100. For example, the prong 125 of the extraction tool 100 can extend within the opening 220 of the housing 200 and around the first portion 315 of the connector 305 with the prong 125 extending between the connector 305 and the housing 200 or between the connector 305 and the shield 310. For example, the extraction tool 100 can include the prong 125 including the tip 130 to disengage the retention member 360 to separate the connector 305 from the housing 200 with the housing 200 around a portion of the body 105 of the extraction tool 100. The housing 200 can be positioned around the second portion 115 of the body 105 of the extraction tool 100 with the prong 125 engaging the retention member 360. The prong 125 can extend between the connector 305 and the housing 200 or between the connector 305 and the shield 310 at a length sufficient to contact the retention member 360.

As the prong 125 advances (e.g., moves) between the connector 305 and the housing 200 or between the connector 305 and the shield 310, the tip 130 of the prong 125 can contact the retention member 360 to bend, flex, rotate, or push the retention member 360 from the angled position (e.g., a position in which the retention member 360 engages the wall 355 of the retaining groove 350) to a disengaged position (e.g., a flattened or un-angled position in which the retention member 360 is released from engagement with the wall 355 of the retaining groove 350). The prong 125 of the extraction tool 100 can contact the retention member 360 to cause the retention member 360 to disengage (e.g., be moved out of engagement with) the retaining groove 350 of the connector 305 and correspondingly disengage the connector 305 from the housing 200 or the shield 310. For example, the connector 305 can be separated (e.g., disengaged) from the housing 200 or the shield 310 with the prong 125 engaging (e.g., contacting, bending, flexing, rotating, pushing) the retention member 360.

The housing 200 can be removed from the connector 305 or the shield 310 with the retention member 360 engaged by the prong 125. For example, the housing 200 can be removed from the connector 305 or the shield 310 with the retention member 360 member disengaged from the retaining groove 350 by moving the housing 200 or the shield 310 in the first direction 390 relative to the extraction tool 100, the connector 305, or the shield 310. The housing 200 can be removed from the connector 305 or the shield 310 by moving the housing 200 or the shield 310 over the extraction tool 100 with the prong 125 of the extraction tool 100 engaging the retention member 360. The housing 200 or the shield 310 can be positioned around the connector 305 with the extraction tool 100 extending into the opening 220 of the housing 200 and between the shield 310 and the connector 305. For example, the extraction tool 100 can be provided into the opening 220 and around the first portion 315 of the connector 305 in the second direction 395 to contact, rotate, flex, bend, or push the retention member 360 out of engagement with the retaining groove 350, and the housing 200 or the shield 310 can be removed over the extraction tool 100 in the first direction 390, as depicted in FIG. 5, among others.

The extraction tool 100 can include the prong 125 to depress a retention member of a connector 305 to separate the housing 200 from the connector 305. For example, the extraction tool 100 can include the tip 130 of the prong 125 to depress the retention member 375 of the connector 305 to separate the housing 200 from the connector 305. The extraction tool 100 can include the tip 130 of the prong 125 to depress the retention member 360 of the housing 200 or the shield 310 to separate the housing 200 from the connector 305. The extraction tool 100 can include multiple prongs 125 to engaged multiple retention members 360, 375 to separate housing 200 from the connector 305. For example, the housing 200 or the shield 310 can include multiple retention members 360 to engage multiple retaining grooves 350 of the connector 305. The housing 200 can include the opening 220 having a number of inner walls corresponding the sides 325 of the connector 305. For example, the connector 305 can include four sides 325 (e.g., with the first portion 315 having a square or rectangular cross-sectional shape). The shield 310 can include four sides corresponding with each of the sides 325 of the connector 305 to provide the shield 310 around the connector 305. Each of the corresponding sides of the opening 220 of the housing 200 or each of the corresponding sides of the shield 310 can include at least one retention member 360 to engage at least one retaining groove 350 of the connector 305. The extraction tool 100 can include multiple prongs 125 to extend between the housing 200 and the connector 305 or between the shield 310 and the connector 305 to engage the multiple retention members 360. For example, the prongs 125 of the extraction tool 100 can each include a tip 130 to engage a retention member 360 of the connector 305 or the shield 310 to separate the connector 305 from the housing 200 or the shield 310. The tips 130 of the prongs 125 can simultaneously engage each of the multiple retention members 360 to separate the connector 305 from the housing 200 or the shield 310. For example, engaging a first retention member 360 and a second retention member 360 simultaneously can decouple the connector 305 from the shield 310 with the shield 310 coupled with the housing 200.

The housing 200 can be removed from the connector 305 or the shield via the extraction tool 100 without damaging the connector 305, the housing 200, or the shield 310. For example, the extraction tool 100 can include the prongs 125 to engage the retention members 360, 375 to disengage the retention members 360, 375 from the walls 355, 370 of the respective retaining grooves 350, 365, where engaging the retention members 360, 375 decouples (e.g., frees, releases) the housing 200 from the connector 305 or the shield 310 or decouples (e.g., frees, releases) the connector 305 from the housing 200 or the shield 310. Because the retention members can include a spring constant or springs, the retention members 360, 375 can return to an angled position with the prongs 125 of the extraction tool 100 removed from engagement with the retention members 360, 375. The housing 200 or the connector 305 can be reinstalled (e.g., coupled) with the retention members 360, 375 in the angled position. For example, the connector 305 can be inserted in the first direction 390 into the opening 220 of the housing 200 to couple the connector 305 with the housing 200 via at least one retention member 360, 375.

The connector 305 or the shield 310 can include multiple retention members 375 to engage multiple retaining grooves 365 of the housing 200. The connector 305 can include the first portion 315 including four sides 325 (e.g., with the first portion 315 having a square or rectangular cross-sectional shape). The shield 310 can include four sides corresponding with each of the sides 325 of the connector 305 to provide the shield 310 around the connector 305. Each of the four sides 325 of the connector 305 or each of the corresponding sides of the shield 310 can include at least one retention member 375 to engage at least one retaining groove 365 of the housing 200. The extraction tool 100 can include multiple prongs 125 to extend between the connector 305 and the housing 200 or between the shield 310 and the housing 200 to engage the multiple retention members 375. For example, the prongs 125 of the extraction tool 100 can each include a tip 130 to engage a retention member 375 of the connector 305 or the shield 310 to separate the housing 200 from the connector 305 or the shield 310. The tips 130 of the prongs 125 can simultaneously engage each of the multiple retention members 375 to separate the connector 305 from the housing 200 or the shield 310. For example, engaging a first retention member 375 and a second retention member 375 simultaneously can decouple the housing 200 from the shield 310 with the shield 310 coupled with the connector 305.

The extraction tool 100 can include the shoulder portion 135 to apply a force to separate the housing 200 from the connector 305. For example, the shoulder portion 135 can apply a force to the shield 310 or to the first portion 315 of the connector 305 to provide leverage to pull the housing 200 in the first direction 390 relative to the extraction tool 100, the connector 305, and the shield 310. The force applied by the shoulder portion 135 can be in the second direction 395, for example. The force applied by the shoulder portion 135 against the connector 305 or the shield 310 can provide leverage to separate the housing 200 from the connector 305 or the shield 310. The shoulder portion 135 can contact the shield 310 (e.g., an end 385 of the shield) to apply the force against the shield 310. For example, first portion 110 of the extraction tool 100 can include the first dimension (e.g., a diameter or a width of the opening 120 within the first portion 110) that is less than a dimension of the shield 310 (e.g., a diameter or a width of the shield 310) such that the shield 310 contacts the shoulder portion 135.

Figure 6:
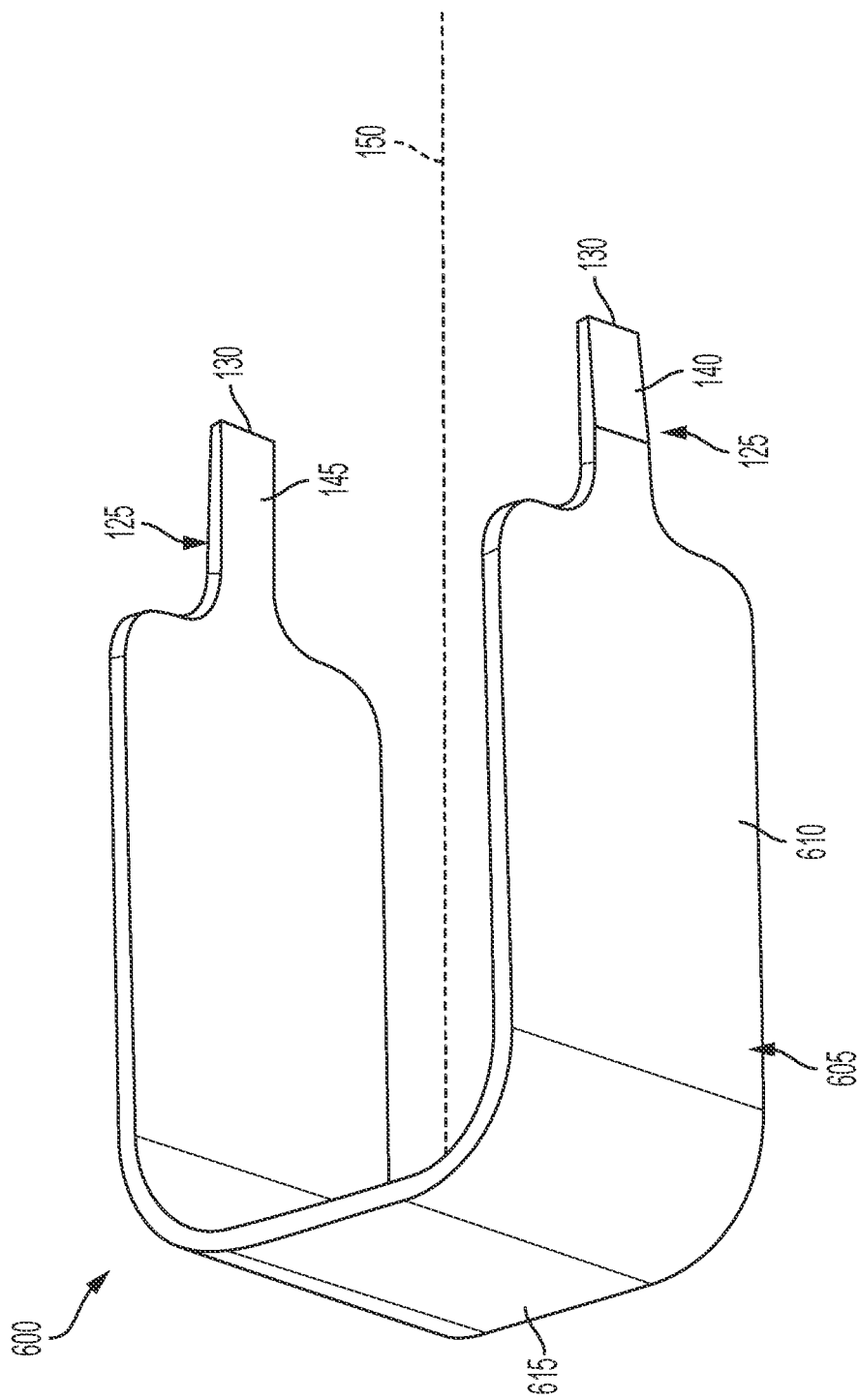
FIG. 6 depicts an example extraction tool, in accordance with some aspects.

As depicted in FIGS. 6-7, among others, the extraction tool can take various forms. For example, the extraction tool can be an extraction tool 600 as depicted in FIG. 6, among others. The extraction tool can be an extraction tool 700 as depicted in FIG. 7, among others. The extraction tool 600 or the extraction tool 700 can be used to separate a housing (e.g., the housing 200 or some other housing) from a connector (e.g., the connector 305 or some other connector) or to separate a housing from a shield (e.g., the shield 310 or some other shield). For example, the extraction tool 600 or the extraction tool 700 can include a configuration or feature such as a number of prongs 125, a size or shape of a body, or some other feature (e.g., a dimension, material, or other feature) to facilitate separation of a housing from a connector or from a shield. Because connectors, shields, or housings can vary (e.g., include a varying number of retention members, exhibit varying dimensions or shape), an extraction tool (e.g., the extraction tool 100, the extraction tool 600, the extraction tool 700, or some other extraction tool) can be configured, structured, or designed to separate a particular housing from a particular connector or from a particular shield, for example.

The extraction tool 600 can include at least one prong 125. The prong 125 can include the tip 130, the outer wall 140, and the inner wall 145. The prong 125 of the extraction tool 600 can engage a retention member (e.g., a retention member 360, a retention member 375, or some other retention member) to decouple (e.g., separate, remove) a housing (e.g., the housing 200 or some other housing of a different configuration) from a connector (e.g., the connector 305 or a connector of a different configuration) or from a shield (e.g., the shield 310 or a shield of a different configuration). For example, the extraction tool 600 can include two prongs 125 to engage two retention members of a shield, housing, or connector to separate the housing from the connector or shield. The two prongs 125 can extend from a body 605 of the extraction tool 600. For example, the extraction tool 600 can include the body portion 605 having at least one first portion 610 and at least one second portion 615. The extraction tool 600 can include one prong 125 extending from each of two first portions 610. For example, the prongs 125 can extend from the first portion 610 in a direction that is parallel or substantially parallel (e.g., ±30° from parallel) with the axis 150. The first portion 610 can be coupled with the second portion 615. For example, the first portion 610 can extend from the second portion 615. The extraction tool 600 can include the second portion 615 oriented perpendicularly or substantially perpendicularly (e.g., ±30° from perpendicular) from the first portion 610. The extraction tool 600 can include two first portions 610. For example, the extraction tool 600 can include the second portion 615 coupled with (e.g., integrally formed with) and perpendicular to two first portions 610 such that the connector 600 exhibits a U-shaped profile. The extraction tool 600 can include some other shape or profile.

The extraction tool 700 can include at least one prong 125. The prong 125 can include the tip 130, the outer wall 140, and the inner wall 145. The prong 125 of the extraction tool 700 can engage a retention member (e.g., a retention member 360, a retention member 375, or some other retention member) to decouple (e.g., separate, remove) a housing (e.g., the housing 200 or some other housing of a different configuration) from a connector (e.g., the connector 305 or a connector of a different configuration) or from a shield (e.g., the shield 310 or a shield of a different configuration). For example, the extraction tool 700 can include four prongs 125 to engage four retention members of a shield, housing, or connector to separate the housing from the connector or shield. The four prongs 125 can extend from a body 705 of the extraction tool 700. For example, the extraction tool 700 can include the body portion 705 having at least one first portion 710 and at least one second portion 715. The first portion 710 can be coupled with the second portion 715. For example, the first portion 710 can extend from the second portion 715. Two prongs 125 can extend from each of two first portions 710. For example, the prongs 125 can extend from the first portion 710 in a direction that is parallel or substantially parallel (e.g., ±30° from parallel) with the axis 150. The extraction tool 700 can include the second portion 715 oriented perpendicularly or substantially perpendicularly (e.g., ±30° from perpendicular) from the first portion 710. The extraction tool 700 can include two first portions 710. For example, the extraction tool 700 can include the second portion 715 coupled with (e.g., integrally formed with) and perpendicular to two first portions 715 such that the extraction tool 700 exhibits a U-shaped profile.

FIG. 8, among others, depicts a flow chart of a method 800 for separating a housing from a connector. For example, the method 800 can be a method of separating the housing 200 from the connector 305. The method 800 can include one or more of ACTS 805-820. The method 800 can be performed with or by the extraction tool 100, the extraction tool 600, the extraction tool 700, or some other extraction tool, for example.

The method 800 can include inserting a connector at ACT 805. For example, the method 800 can include inserting the connector 305 into the opening 120 of the extraction tool 100 at ACT 805. The first end 320 or the first portion 315 of the connector 305 can be inserted into the opening 120 of the extraction tool 100. For example, the connector 305 can be inserted into the opening 120 of the extraction tool 100 with the connector 305 coupled with the housing 200. The first portion 315 of the connector 305 can extend into the opening 220 of the housing 200 with the connector 305 coupled with the housing 200. The extraction tool 100 can provided around the connector 305 with the connector 305 coupled with the housing 200. For example, the extraction tool 100 can be provided over the first portion 315 of the connector 305 and within the opening 220 of the housing 200. The extraction tool 100 (or a portion of the extraction tool 100) can be provided between the connector 305 and the housing 200, between the housing 200 and the shield 310, or between the connector 305 and the shield 310.

The method 800 can include engaging a retention member at ACT 810. For example, the method 800 can include engaging (e.g., depressing, contacting, bending, flexing, rotating, pushing, or otherwise engaging) at least one retention member 360 or 375 with at least one prong 125. The retention member 360 can extend from the housing 200 or from the shield 310 to engage at least one retaining groove 350 of the connector 305. The retention member 375 can extend from the connector 305 or from the shield 310 to engage at least one retaining groove 365 of the housing 200. The extraction tool 100 can include at least one prong 125 extending from the second portion 115 of the body 105 of the extraction tool 100. The prongs 125 can be long, thin, slender members to fit between the connector 305 and the housing 200, between the housing 200 and the shield 310, or between the connector 305 and the shield 310. For example, the prong 125 can extend between the connector 305 and the housing 200, between the housing 200 and the shield 310, or between the connector 305 and the shield 310 to engage the retention member 360 or the retention member 375. The prong 125 can include a tip 130 including a taper to guide the tip 130 and the prong 125 between the connector 305 and the housing 200, between the housing 200 and the shield 310, or between the connector 305 and the shield 310. The tip 130 can engage (e.g., bend, flex, rotate, push, depress) the retention member 360 or the retention member 375 to disengage the retention member 360, 375 from the respective retaining groove 350, 365. For example, the prong 125 can engage the retention member 360, 375 such that the retention member 360, 375 is released from (e.g., freed from, removed from contact with) the wall 355, 370 of the retaining groove 350, 365, respectively. The connector 305 can be separated from the housing 200 or the shield 310 with the retention member 360 disengaged from the retaining groove 350. The housing 200 can be separated from the connector 305 or the shield 310 with the retention member 375 disengaged from the retaining groove 365.

The method 800 can include applying a force at ACT 815. For example, the method 800 can include applying a force via a shoulder portion 135 of the extraction tool 100 to remove the housing 200 from the connector 305 at ACT 815. For example, the extraction tool 100 can include a shoulder portion 135 defined by a difference in a dimension of the first portion 110 and the second portion 115 of the extraction tool 100. The shoulder portion 135 can be perpendicular to the axis 150 or be otherwise non-parallel with the axis 150. The shoulder portion 135 can contact the first end 320 of the connector 305 or an end 385 of the shield 310 with the connector 305 inserted into the opening 120 of the extraction tool 100 (e.g., as at ACT 805) or with the retention member 360, 375 engaged by the prong 125 or tip 130 of the extraction tool 100, (e.g., as at ACT 810). A force can be applied in the second direction 395 via the shoulder portion 135 against the connector 305 or the shield 310 to remove the housing 200 from the connector 305 or the shield 310. For example, the shoulder portion 135 can apply a force against the connector 305 or the shield 310 as the housing 200 is moved in the first direction 390 relative to the connector 305, the shield 310, or the extraction tool 100. The shoulder portion 135 can apply a force against the connector 305 or the shield 310 to provide leverage to remove the housing 200 from the connector 305 or the shield 310 with the extraction tool 100 between the connector 305 and the housing 200. For example, the shoulder portion 135 can apply a force against the connector 305 or the shield 310 to provide leverage to remove the housing 200 from the connector 305 or the shield 310 with the prong 125 of the extraction tool 100 engaging the retention member 360 or the retention member 375.

The method 800 can include separating the housing at ACT 820. For example, the method 800 can include separating or removing the housing 200 from the connector 305 or the shield 310 at ACT 820. The housing 200 can be removed from the connector 305 or the shield 310 with the extraction tool 100 engaging the retention members 360, 375 to disengage the retention members 360, 375 from the respective retaining grooves 350, 365. For example, the housing 200 can be separated (e.g., disengaged) from the connector 305 or the shield 310 with the prong 125 of the extraction tool 100 engaging (e.g., contacting, bending, flexing, rotating, pushing, depressing) the retention member 360, 375 to disengage the retention member 360, 375 from the respective wall 355, 370 of the retaining groove 350, 365. The housing 200 can be removed from the connector 305 or the shield 310 by moving the housing 200 in the first direction 390 with the retention member 360, 375 disengaged from the respective wall 355, 370 of the retaining groove 350, 365. For example, the shoulder portion 135 of the extraction tool 100 can apply a force in the second direction 395 with the prong 125 engaging the retention member 360, 375 to separate the housing 200 from the connector 305 or the shield 310 as the housing 200 is moved over the extraction tool 100, the connector 305, and the shield 310 in the first direction 390.

FIG. 9 depicts an example cross-sectional view 900 of an electric vehicle 905 installed with at least one battery pack 910. Electric vehicles 905 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 910 can also be used as an energy storage system to power a building, such as a residential home or commercial building. Electric vehicles 905 can be fully electric or partially electric (e.g., plug-in hybrid) and further, electric vehicles 905 can be fully autonomous, partially autonomous, or unmanned. Electric vehicles 905 can also be human operated or non-autonomous. Electric vehicles 905 such as electric trucks or automobiles can include on-board battery packs 910, batteries 915 or battery modules 915, or battery cells 920 to power the electric vehicles. The electric vehicle 905 can include a chassis 925 (e.g., a frame, internal frame, or support structure). The chassis 925 can support various components of the electric vehicle 905. The chassis 925 can span a front portion 930 (e.g., a hood or bonnet portion), a body portion 935, and a rear portion 940 (e.g., a trunk, payload, or boot portion) of the electric vehicle 905. The battery pack 910 can be installed or placed within the electric vehicle 905. For example, the battery pack 910 can be installed on the chassis 925 of the electric vehicle 905 within one or more of the front portion 930, the body portion 935, or the rear portion 940. The battery pack 910 can include or connect with at least one busbar, e.g., a current collector element. For example, the first busbar 945 and the second busbar 950 can include electrically conductive material to connect or otherwise electrically couple the battery 915, the battery modules 915, or the battery cells 920 with other electrical components of the electric vehicle 905 to provide electrical power to various systems or components of the electric vehicle 905.

FIG. 10 depicts an example battery pack 910. Referring to FIG. 10, among others, the battery pack 910 can provide power to electric vehicle 905. Battery packs 910 can include any arrangement or network of electrical, electronic, mechanical or electromechanical devices to power a vehicle of any type, such as the electric vehicle 905. The battery pack 910 can include at least one housing 1000. The housing 1000 can include at least one battery module 915 or at least one battery cell 920, as well as other battery pack components. The battery module 915 can be or can include one or more groups of prismatic cells, cylindrical cells, pouch cells, or other form factors of battery cells 920. The housing 1000 can include a shield on the bottom or underneath the battery module 915 to protect the battery module 915 and/or cells 920 from external conditions, for example if the electric vehicle 905 is driven over rough terrains (e.g., off-road, trenches, rocks, etc.) The battery pack 910 can include at least one cooling line 1005 that can distribute fluid through the battery pack 910 as part of a thermal/temperature control or heat exchange system that can also include at least one thermal component (e.g., cold plate) 1010. The thermal component 1010 can be positioned in relation to a top submodule and a bottom submodule, such as in between the top and bottom submodules, among other possibilities. The battery pack 910 can include any number of thermal components 1010. For example, there can be one or more thermal components 1010 per battery pack 910, or per battery module 915. At least one cooling line 1005 can be coupled with, part of, or independent from the thermal component 1010.

Figure 11:
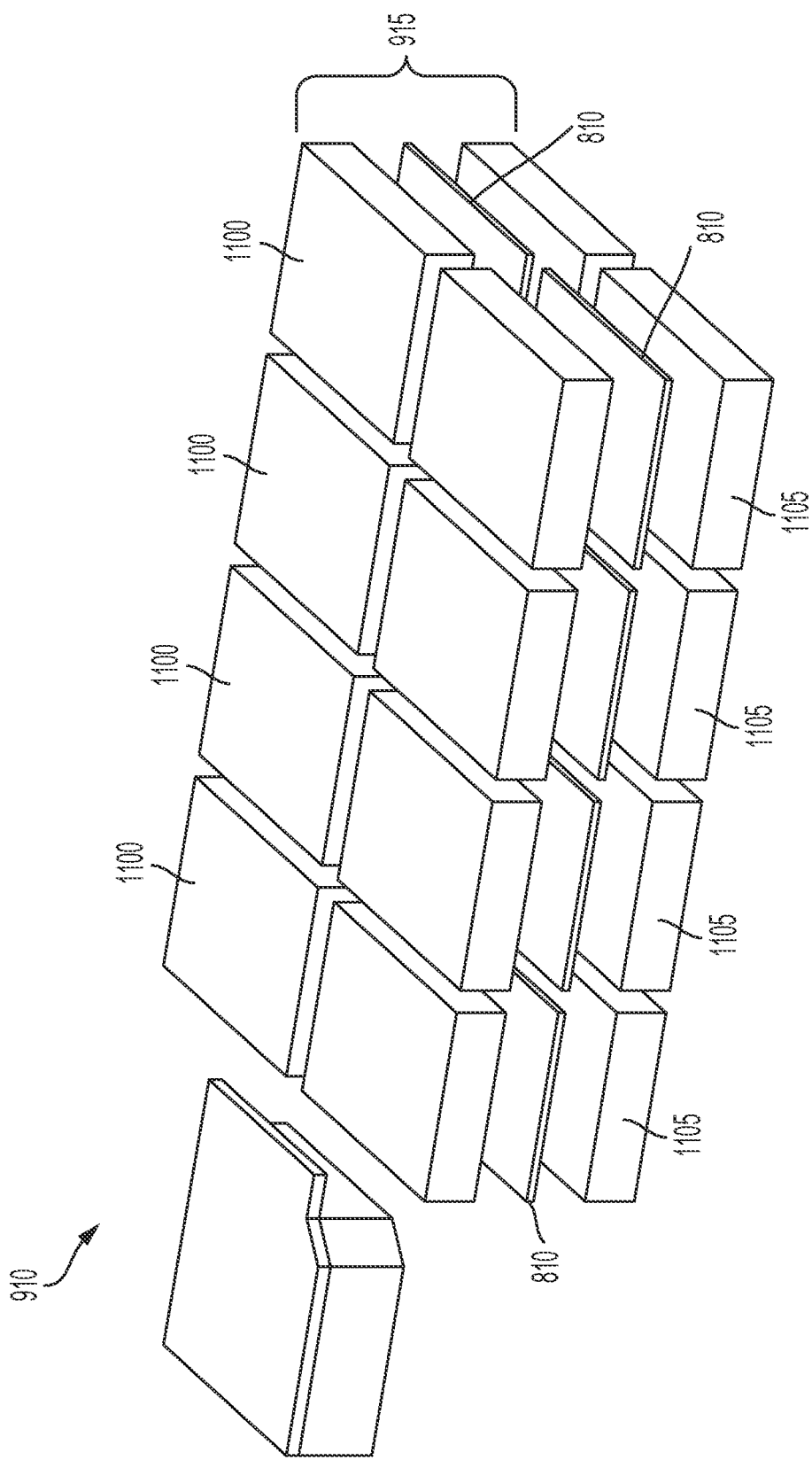
FIG. 11 depicts an example battery module, in accordance with some aspects.

FIG. 11 depicts example battery modules 915. The battery modules 915 can include at least one submodule. For example, the battery modules 915 can include at least one first (e.g., top) submodule 1100 or at least one second (e.g., bottom) submodule 1105. At least one thermal component 1010 can be disposed between the top submodule 1100 and the bottom submodule 1105. For example, one thermal component 1010 can be configured for heat exchange with one battery module 915. The thermal component 1010 can be disposed or thermally coupled between the top submodule 1100 and the bottom submodule 1105. One thermal component 1010 can also be thermally coupled with more than one battery module 915 (or more than two submodules 1100, 1105). The thermal components 1010 shown adjacent to each other can be combined into a single thermal component 1010 that spans the size of one or more submodules 1100 or 1105. The thermal component 1010 can be positioned underneath submodule 1100 and over submodule 1105, in between submodules 1100 and 1105, on one or more sides of submodules 1100, 1105, among other possibilities. The thermal component 1010 can be disposed in sidewalls, cross members, structural beams, among various other components of the battery pack, such as battery pack 910 described above. The battery submodules 1100, 1105 can collectively form one battery module 915. In some examples each submodule 1100, 1105 can be considered as a complete battery module 915, rather than a submodule.

The battery modules 915 can each include a plurality of battery cells 920. The battery modules 915 can be disposed within the housing 1000 of the battery pack 910. The battery modules 915 can include battery cells 920 that are cylindrical cells or prismatic cells, for example. The battery module 915 can operate as a modular unit of battery cells 920. For example, a battery module 915 can collect current or electrical power from the battery cells 920 that are included in the battery module 915 and can provide the current or electrical power as output from the battery pack 910. The battery pack 910 can include any number of battery modules 915. For example, the battery pack can have one, two, three, four, five, six, seven, eight, nine, ten, eleven, twelve or other number of battery modules 915 disposed in the housing 1000. It should also be noted that each battery module 915 may include a top submodule 1100 and a bottom submodule 1105, possibly with a thermal component 1010 in between the top submodule 1100 and the bottom submodule 1105. The battery pack 910 can include or define a plurality of areas for positioning of the battery module 915 and/or cells 920. The battery modules 915 can be square, rectangular, circular, triangular, symmetrical, or asymmetrical. In some examples, battery modules 915 may be different shapes, such that some battery modules 915 are rectangular but other battery modules 915 are square shaped, among other possibilities. The battery module 915 can include or define a plurality of slots, holders, or containers for a plurality of battery cells 920. It should be noted that the illustrations and descriptions herein are provided for example purposes and should not be interpreted as limiting. For example, the battery cells 920 can be inserted in the battery pack 910 without battery modules 1100 and 1105. The battery cells 920 can be disposed in the battery pack 910 in a cell-to-pack configuration without modules 1100 and 1105, among other possibilities.

Figure 12:
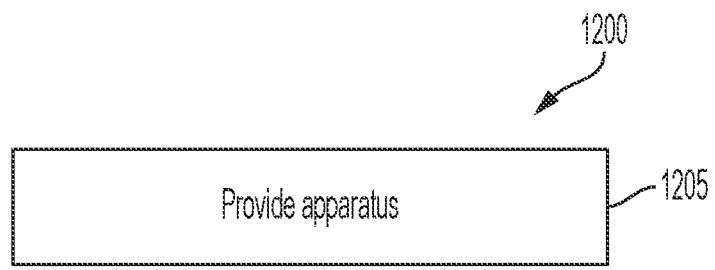
FIG. 12 is a flow chart of a method or providing an extraction tool, in accordance with some aspects.

FIG. 12, among others, depicts a method 1200 of providing an apparatus at ACT 1205. The apparatus can be the extraction tool 100. The extraction tool 100 can include a body 105 including a first portion 110, a second portion, a shoulder portion 135, and at least one prong 125. The shoulder portion 135 can be defined by a difference in a dimension (e.g., a width) of the first portion 110 and the second portion 115. An opening 120 can be defined through the first portion 110, the shoulder portion 135, and the second portion 115. The prong 125 can include a tip 130. The tip 130 can be tapered. The prong 125 can extend between a connector 305 and a housing 200 of an electrical connector assembly 300, between the connector 305 and a shield 310, or between the housing 200 and the shield 310. The tip 130 of the prong 125 can be inserted between a connector 305 and a housing 200, between the connector 305 and a shield 310, or between the housing 200 and the shield 310 to engage at least one retention member 360, 375 to separate the housing 200 from the connector 305 or the shield 310.

Figure 13:
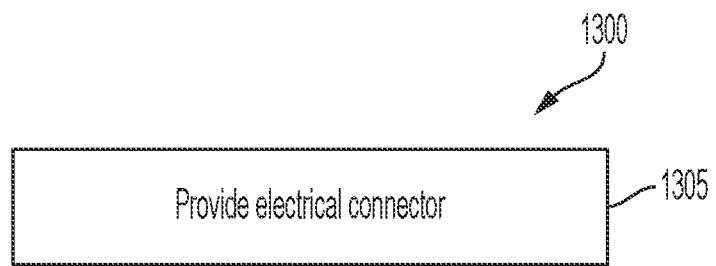
FIG. 13 is a flow chart of a method of providing an electrical connector assembly, in accordance with some aspects.

FIG. 13, among others, depicts a method 1300 of providing an electrical connector assembly at ACT 1305. For example, the method 1300 can include providing the electrical connector assembly 300 at ACT 1305. The electrical connector assembly 300 can include a housing 200, a connector 305, and a shield 310. The connector 305 can be extend (e.g., be provided, be inserted) into an opening 220 of the housing 200. For example, a first portion 315 of the connector 305 can extend in a first direction 390 into the opening 220 of the housing 200. The shield 310 can optionally be positioned around the first portion 315 of the connector 305 and between the connector 305 and the housing 200 with the connector 305 coupled with the housing 200. At least one retention member 360 of the housing 200 or the shield 310 can engage a retaining groove 350 of the connector 305 to couple the housing 200 or the shield 310 with the connector 305. At least one retention member 375 of the connector 305 or the shield 310 can engage a retaining groove 365 of the housing 200 to couple the connector 305 or the shield 310 with the housing 200. The retention member 360, 375 can be engageable by a prong of an extraction tool, such as the extraction tool 100. For example, the prong 125 of the extraction tool 100 can engage at least one retention member 360, 375 to separate the housing 200 from the connector 305 or the shield 310 or to separate the connector 305 from the housing 200 or the shield 310.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:
a body; and
a prong comprising a tip extending from the body, the tip to depress a retention member of a connector to separate a housing from the connector, the connector to electrically couple a battery pack of an electric vehicle with a drive unit of the electric vehicle.

2. The apparatus of claim 1, comprising:
the tip to depress the retention member disposed between the housing and the connector.

3. The apparatus of claim 1, comprising:
the tip to depress the retention member disposed between the housing and the connector, wherein engaging the retention member decouples the housing from the connector.

4. The apparatus of claim 1, comprising:
the tip to depress the retention member disposed between the housing and the connector to disengage the retention member from a retaining groove, wherein disengaging the retention member from the retaining groove decouples the housing from the connector.

5. The apparatus of claim 1, comprising:
the body including a first portion having a first dimension, a second portion having a second dimension, and a shoulder portion between the first portion and the second portion, wherein the first dimension is less than the second dimension to define the shoulder portion; and
the shoulder portion to apply a force to the connector to separate the housing from the connector.

6. The apparatus of claim 1, comprising:
the body defining an opening; and
the prong to depress the retention member with the connector at least partially extending into the opening.

7. The apparatus of claim 1, comprising:
the body including a shoulder portion;
the tip to engage the retention member of a shield disposed between the housing and the connector, wherein engaging the retention member decouples the housing from the shield with the shield coupled with the connector; and
the shoulder portion to apply a force to the shield to separate the housing from the shield and the connector.

8. The apparatus of claim 1, wherein the prong is a first prong, the tip is a first tip, and the retention member is a first retention member comprising:
a second prong including a second tip extending from the body parallel with the first prong;
the first tip to engage the first retention member of a shield with the shield disposed between the housing and the connector, the first retention member extending from a first side of the connector; and
the second tip to engage a second retention member of the shield, the second retention member extending from a second side of the connector.

9. The apparatus of claim 1, wherein the prong is a first prong, the tip is a first tip, and the retention member is a first retention member, the apparatus comprising:
the body including a shoulder portion;
a second prong including a second tip, the second prong extending from the body parallel with the first prong;

the first tip to engage the first retention member of a shield with the shield disposed between the housing and the connector, the first retention member extending from a first side of the connector;

the second tip to engage a second retention member of the shield, the second retention member extending from a second side of the connector; and the shoulder portion to apply a force to the shield to separate the housing from the shield and the connector.

10. The apparatus of claim 1, wherein the prong is a first prong, the tip is a first tip, and the retention member is a first retention member, the apparatus comprising:

a second prong including a second tip, the second prong extending from the body parallel with the first prong;

the first tip to engage the first retention member of a shield with the shield disposed between the housing and the connector, the first retention member extending from a first side of the connector; and the second tip to engage a second retention member of the shield, the second retention member extending from a second side of the connector;

wherein engaging the first retention member and the second retention member simultaneously decouples the housing from the shield with the shield coupled with the connector.

11. The apparatus of claim 1, comprising:

the tip including a taper, the taper to guide the tip between the housing and the connector.

12. The apparatus of claim 1, comprising:

the tip including a taper angled inwards, the taper to guide the tip between the housing and the connector.

13. The apparatus of claim 1, wherein the prong is a first prong, the tip is a first tip, and the retention member is a first retention member, the apparatus comprising:

the tip including a taper angled inwards, the taper to guide the tip between the housing and the connector;

a second prong including a second tip extending from the body parallel with the first prong, the second tip including a second taper angled inwards, the second taper to guide the second tip between the housing and the connector;

the first tip to engage the first retention member of a shield with the shield disposed between the housing and the connector, the first retention member extending from a first side of the connector; and the second tip to engage a second retention member of the shield, the second retention member extending from a second side of the connector;

wherein engaging the first retention member and the second retention member simultaneously decouples the housing from the shield with the shield coupled with the connector.

14. A method, comprising:

inserting a connector into an opening of an extraction tool, the connector to electrically couple a battery pack of an electric vehicle with a drive unit of the electric vehicle;

depressing, by a prong of the extraction tool, a retention member to decouple the connector from a housing; and separating the housing from the connector with the connector in the opening and the prong depressing the retention member.

15. The method of claim 14, wherein the extraction tool includes a shoulder portion extending perpendicular to the prong, comprising:

applying, by the shoulder portion, a force to the connector to remove the housing from the connector.

16. The method of claim 14, wherein the prong includes a tapered tip, the tapered tip to guide the prong between the housing and the connector.

17. The method of claim 14, wherein the retention member extends from a shield disposed between the housing and the connector, wherein engaging the retention member decouples the housing from the shield with the shield coupled with the connector.

18. An electrical connector assembly, comprising:

a connector extending into an opening of a housing, the connector to electrically couple a battery pack of an electric vehicle with a drive unit of the electric vehicle; and a retention member to engage a notch of the housing to couple the connector to the housing;

the retention member engageable by a prong of an extraction tool to separate the housing from the connector, the prong including a tip to guide the prong between the connector and the housing without damaging the connector or the housing.

19. The electrical connector assembly of claim 18, wherein the retention member extends from a shield disposed between the housing and the connector, wherein the retention member is engageable by the prong of the extraction tool to separate the housing from the shield with the shield coupled with the connector.

* * * * *